US007936640B2

(12) United States Patent  
Robinson

(10) Patent No.: US 7,936,640 B2  
(45) Date of Patent: May 3, 2011

(54) RADON TRANSFORMATION FOR REMOVAL OF NOISE FROM SEISMIC DATA

(76) Inventor: John M. Robinson, Houston, TX (US)

( * ) Notice: Subject to any disclaimer, the term of this patent is extended or adjusted under 35 U.S.C. 154(b) by 0 days.

(21) Appl. No.: 12/456,743

(22) Filed: Jun. 22, 2009

(65) Prior Publication Data

US 2009/0262602 A1 Oct. 22, 2009

Related U.S. Application Data

(62) Division of application No. 11/072,472, filed on Mar. 4, 2005, now Pat. No. 7,561,491.

(51) Int. Cl.  
*G01V 1/00* (2006.01)

(52) U.S. Cl. ........................................................ 367/38

(58) Field of Classification Search ............... 367/24, 367/43, 46, 47, 49  
See application file for complete search history.

(56) References Cited

U.S. PATENT DOCUMENTS

| | | | |
|---|---|---|---|
| 4,594,693 A | 6/1986 | Pann et al. ........................ | 367/43 |
| 4,628,492 A | 12/1986 | Winney | |
| 4,860,265 A | 8/1989 | Laster et al. ...................... | 367/73 |
| 5,138,583 A | 8/1992 | Wason et al. | |
| 5,189,644 A | 2/1993 | Wood ................................ | 367/38 |
| 5,572,483 A | 11/1996 | Chambers et al. ................ | 367/45 |
| 5,583,825 A | 12/1996 | Carrazzone et al. | |
| 5,642,327 A | 6/1997 | Schiflett et al. | |
| 5,719,822 A | 2/1998 | Wang ................................. | 367/53 |

(Continued)

FOREIGN PATENT DOCUMENTS

EP 0 515 189 A2 11/1992

(Continued)

OTHER PUBLICATIONS

Guitton, "Prestack multiple attenuation using the hyperbolic Radon transform", Stanford Exploration Project, Report 103, Apr. 27, 2000.*

(Continued)

*Primary Examiner* — Jack Keith  
*Assistant Examiner* — Krystine Breier  
(74) *Attorney, Agent, or Firm* — Keith B Willhelm

(57) ABSTRACT

Methods of processing seismic data to remove unwanted noise from meaningful reflection signals are provided for. Assembled seismic data are transformed from the offset-time domain to the time-slowness domain using a Radon transformation. Preferably, the Radon transformation is applied within defined slowness limits $p_{min}$ and $p_{max}$ that will preserve coherent noise, and according to an index j of the slowness set and a sampling variable $\Delta p$; wherein $$j = \frac{p_{max} - p_{min} + 1\mu sec/m}{\Delta p},$$

$\Delta p$ is from about 0.5 to about 4.0 µsec/m. The coherent noise content of the transformed data is then enhanced, and the primary reflection signal content diminished by filtering at least a subset of the transformed data. The filtered data are inverse transformed from the time-slowness domain back to the offset-time domain using an inverse Radon transformation, and, if necessary, an inverse of the offset weighting factor $p''$ is applied to the inverse transformed data, wherein $0<n<1$, to restore the amplitude data. The restored amplitude data of the filtered data are then subtracted from the originally assembled amplitude data. The coherent noise content of the assembled amplitude data is thereby diminished and the primary reflection signal content enhanced.

70 Claims, 3 Drawing Sheets

U.S. PATENT DOCUMENTS

| | | | |
|---|---|---|---|
| 5,909,655 A | 6/1999 | Canadas et al. ............... | 702/17 |
| 5,970,023 A | 10/1999 | Chambers et al. ............. | 367/63 |
| 6,018,500 A | 1/2000 | Chambers | |
| 6,094,620 A | 7/2000 | Gasparotto et al. | |
| 6,208,587 B1 | 3/2001 | Martin ........................... | 367/50 |
| 6,446,007 B1 | 9/2002 | Finn et al. | |
| 6,507,787 B1 | 1/2003 | Ferreira da Silva et al. | |
| 6,574,567 B2 | 6/2003 | Martinez ........................ | 702/17 |
| 6,636,810 B1 | 10/2003 | Moore et al. ................... | 702/17 |
| 6,651,007 B2 | 11/2003 | Ozbek ............................ | 702/17 |
| 6,691,039 B1 | 2/2004 | Wood | |
| 6,721,662 B2 | 4/2004 | Wood | |
| 6,735,528 B2 | 5/2004 | Wood | |
| 6,738,715 B2 | 5/2004 | Shatilo .......................... | 702/17 |
| 6,763,304 B2 | 7/2004 | Schonewille .................. | 702/14 |
| 6,832,161 B1 | 12/2004 | Moore ........................... | 702/17 |
| 6,987,706 B2 | 1/2006 | Wood ............................ | 367/43 |
| 7,239,578 B2 | 7/2007 | Robinson ....................... | 367/43 |
| 7,366,054 B1 | 4/2008 | Wood ............................ | 367/43 |
| 7,561,491 B2 | 7/2009 | Robinson ....................... | 367/43 |
| 7,564,740 B2 | 7/2009 | Wood ............................ | 367/43 |
| 2004/0117122 A1 | 6/2004 | Choo et al. ..................... | 702/17 |
| 2009/0005999 A1 | 1/2009 | Wood ............................ | 702/17 |
| 2009/0285052 A1 | 11/2009 | Wood ............................ | 367/43 |

FOREIGN PATENT DOCUMENTS

| | | |
|---|---|---|
| EP | 1094339 | 4/2001 |
| FR | 2801387 | 5/2001 |
| WO | 00/42448 | 7/2000 |
| WO | 02/059649 A1 | 8/2002 |
| WO | 2004/020972 A2 | 3/2004 |

OTHER PUBLICATIONS

Trad, "Accurate interpolation with high-resolution time-variant Radon transforms", Geophysics, vol. 69, No. 2. (Mar.-Apr. 2002).*
Guitton, "Prestack multiple attenuation using hyperbolic Radon transform", Stanford Exploration Project, report 103, Apr. 27, 2000.*
Office Action, U.S. Pat. No. 6,691,039, U.S. Appl. No. 10/232,118, mailed Jul. 16, 2003.
Office Action, U.S. Pat. No. 6,721,662, U.S. Appl. No. 10/238,461, mailed Aug. 13, 2003.
Office Action, U.S. Pat. No. 6,735,528, U.S. Appl. No. 10/238,212, mailed Aug. 6, 2003.
Office Action, U.S. Pat. No. 6,987,706, U.S. Appl. No. 10/238,366, mailed May 11, 2004.
Office Action, U.S. Pat. No. 7,239,578, U.S. Appl. No. 11/070,943, mailed Nov. 8, 2006.
Office Action, U.S. Pat. No. 7,561,491, U.S. Appl. No. 11/072,472, mailed Jul. 3, 2006.
Office Action, U.S. Pat. No. 7,561,491, U.S. Appl. No. 11/072,472, mailed Nov. 27, 2006.
Office Action, U.S. Pat. No. 7,561,491, U.S. Appl. No. 11/072,472, mailed Mar. 16, 2007.
Office Action, U.S. Pat. No. 7,561,491, U.S. Appl. No. 11/072,472, mailed Jul. 20, 2007.
Office Action, U.S. Pat. No. 7,561,491, U.S. Appl. No. 11/072,472, mailed Jan. 24, 2008.
Office Action, U.S. Pat. No. 7,561,491, U.S. Appl. No. 11/072,472, mailed Mar. 19, 2008.
Office Action, U.S. Pat. No. 7,561,491, U.S. Appl. No. 11/072,472, mailed Oct. 14, 2008.
Advisory Office Action, U.S. Pat. No. 7,561,491, U.S. Appl. No. 11/072,472, mailed Apr. 2, 2009.
Office Action, U.S. Pat. No. 7,564,740, U.S. Appl. No. 11/075,326, mailed Jun. 26, 2007.
Office Action, U.S. Pat. No. 7,564,740, U.S. Appl. No. 11/075,326, mailed Feb. 11, 2008.
Office Action, U.S. Pat. No. 7,564,740, U.S. Appl. No. 11/075,326, mailed Jun. 24, 2008.
Office Action, U.S. Pat. No. 7,564,740, U.S. Appl. No. 11/075,326, mailed Oct. 31, 2008.
Advisory Office Action, U.S. Pat. No. 7,564,740, U.S. Appl. No. 11/075,326, mailed Apr. 8, 2009.
Office Action, U.S. Pat. No. 7,366,054, U.S. Appl. No. 11/647,935, mailed Jul. 20, 2007.
Office Action, U.S. Publ. Appl. No. 2009/0005999, U.S. Appl. No. 11/700,663, mailed Feb. 6, 2009.
Office Action, U.S. Publ. Appl. No. 2009/0005999, U.S. Appl. No. 11/700,663, mailed Nov. 23, 2009.
Office Action, U.S. Publ. Appl. No. 2009/0258052, U.S. Appl. No. 12/456,734, mailed Sep. 16, 2009.
Belkin, Gregory, *Discrete Radon Transform*, IEEE Transactions on Acoustics Speech and Signal Processing, vol. AASP-35, pp. 162-172 (1987).
Bergler, Steffen et al., *Hyperbolic Reflection Moveout Revisited*, EAGE 1951-2001 (2001).
Bickel, S.H., *Focusing Aspects of the Hyperbolic Radon Transform*, 65(2) Geophysics 652-55 (2000).
Brandsberg-Dahl, S. et al., *AVA (Amplitude Versus Angle) Analysis and Compensation on Common Image Gathers in the Angle Domain*, 63$^{rd}$ EAGE Conference (Amsterdam 2001) (abstract).
Dix, C. H., *Seismic Velocities from Surface Measurements*, 20(1) Geophysics 68-86 (1955).
Durbaum, H., *Zur Bestimmung von Wellengeschwindigkeiten aus Reflexionsseismischen Messungen*, 2(2) Geophys.Prosp. 151-76 (1954).
*Focus*, Version 5.0, "Help" printouts (Paradigm Geophysical Corp. 2001).
Fokkema, J. T. et al., *The Pre-Stack Image Map of Surface Seismic Data in the Horizontal Time-Vertical Time Domain*, 54$^{th}$ EAGE Conference (Paris 1992). (abstract).
Foster, D.J., et al., *Suppression of Multiple Reflections using the Radon Transform*, 57(3) Geophysics 386-95 (1992).
Guitton, A., *Prestack Multiple Attenuation Using the Hyperbolic Radon Transform*, Stanford Exploration Project, Report 103, pp. 123-195 (Apr. 27, 2000).
Hagedoorn, H., *A Process of Seismic Reflection Interpretation*, 2(2) Geophys.Prosp. 85-127 (1954).
Hampson, D., *Inverse Velocity Stacking for Multiple Elimination*, 22 J.Can.Soc.Expl.Geophys. 44-45 (1986).
Hampson, D., *The Discrete Radon Transform: A New Tool for Image Enhancement and Noise Suppression*, Society of Exploration Geophysicists 57$^{th}$ Annual International Meeting, Expanded Abstracts pp. 141-143.
Hargreaves, Neil et al., *High-Resolution Radon Demultiple*, Society of Exploration Geophysicists International Exposition and 71$^{st}$ Annual Meeting, Expanded Abstracts with Biographies vol. I, pp. 1325-1338 (Tulsa, Oklahoma, Society of Exploration Geophysicists, Sep. 9-14, 2001).
Herrman, P., et al., *De-Aliased, High-Resolution Radon Transforms*, Society of Exploration Geophysicists 70$^{th}$ Annual International Meeting, SP2.3 (2000).
Krey, T., *An Approximate Correction Method for Refraction in Reflection Seismic Prospecting*, 16(3) Geophysics 468-85 (1951).
Krey, T., *Bemerkungen zu Einer Formel fur Geschwindigkeitsbestimmungen aus Seismischen Messungen von C. H. Dix*, 7 Erdol and Kohle 8-9 (1954).
Marfurt, K.J., et al., *Pitfalls of Using Conventional and Discrete Radon Transforms on Poorly Sampled Data*, 61(5) Geophysics 1467-82 (1996).
Marzetta, T. L., *Fan Filters, the 3-D Radon Transform, and Image Sequence Analysis*, 3 (No. 3) IEE Transactions on Image Processing 253-64 (1994).
Mayne, W. H., *Common Reflection Point Horizontal Data Stacking Techniques*, 27(6) Geophysics 927-38 (1962).
Mitchell, A. R. et al., *Efficient Tau-P Hyperbolic Velocity Filtering*, 55 Geophysics 619-25 (1990).
Moon, W., et al., *Radon Transform Wave Field Separation for Vertical Seismic Profiling Data*, 51 (No. 4) Geophysics 940-47 (1986).
Nural Kabir, N.M., et al., *Toward True Amplitude Multiple Removal*, The Leading Edge 66-73 (Jan. 1999).
O'Brien, P. N. S., et al., *Velocity Dispersion of Seismic Waves*, 19 Geophysical Prospecting 1-26 (1971).
*ProMax 3D*, vol. 1, Version 6.0, pp. 929-933 (1995).
Sacchi, M. D., *Aperture Compensated Radon and Fourier Transforms*, PhD Thesis, British Columbia University (1996) (abstract).

Sacchi, M. D., et al., *Fast High Resolution Parabolic Radon Transform*, Society of Exploration Geophysicists 69th Annual International Meeting, SPRO P1.1 (1999).

Sacchi, M. D., et al., *High-Resolution Velocity Gathers and Offset Space Reconstruction*, 60(4) Geophysics 1169-1177 (1995).

Sacchi, M.D., et al., *Simultaneous Signal and Noise Modeling Via the Radon Transformation*, 66rd EAGE Conference (Paris Jun. 10, 2004).

Schonewille, M.A., et al., *Parabolic Radon Transform, Sampling and Efficiency*, 66(2) Geophysics 667-78 (2001).

Shah, P. M., *Use of Wavefront Curvature to Relate Seismic Data with Subsurface Parameters*, 38(5) Geophysics 812-825 (1973).

Shultz, P.S., "A Method for Direct Estimation of Interval Velocities," 47 *Geophysics* 1657-71 (1982).

Spitzer, Roman, et al., *Enhancing Subbasalt Reflections Using Parabolic $\tau$-$p$ Transformation*, The Leading Edge 1184-1201 (Dec. 2003).

Spitzer, Roman, et al., *Reducing Source-Generated Noise in Shallow Seismic Data Using Linear and Hyperbolic $\tau$-$p$ Transformations*, 66 (No. 5) Geophysics 1612-21 (2001).

Thorson, J. R. et al., *Velocity-Stack and Slant-Stack Stochastic Inversion*, 50 Geophysics 2727-41 (1985).

Trad, D.O., et al., *Accurate Interpolation with High-Resolution Time-Variant Radon Transforms*, 67(2) Geophysics 644-56 (2002).

Yilmaz, Ozdogan, Seismic Data Analysis: Processing, Inversion, and Interpretation of Seismic Data, vol. 1, pp. 938-948 (Tulsa, Oklahoma, Society of Exploration Geophysicists, 2001).

* cited by examiner

RADON TRANSFORMATION FOR REMOVAL OF NOISE FROM SEISMIC DATA

CLAIM TO PRIORITY

This application is a divisional of an application of John M. Robinson entitled "Radon Transformations for Removal of Noise From Seismic Data," U.S. Ser. No. 11/072,472, filed Mar. 4, 2005 now U.S. Pat. No. 7,561,491.

BACKGROUND OF INVENTION

The present invention relates to processing of seismic data representative of subsurface features in the earth and, more particularly, to improved methods of and apparatus for processing seismic data using improved Radon transformations to remove unwanted noise from meaningful reflection signals.

Seismic surveys are one of the most important techniques for discovering the presence of oil and gas deposits. If the data are properly processed and interpreted, a seismic survey can give geologists a picture of subsurface geological features, so that they may better identify those features capable of holding oil and gas. Drilling is extremely expensive, and ever more so as easily tapped reservoirs are exhausted and new reservoirs are harder to reach. Having an accurate picture of an area's subsurface features can increase the odds of hitting an economically recoverable reserve and decrease the odds of wasting money and effort on a nonproductive well.

The principle behind seismology is deceptively simple. As seismic waves travel through the earth, portions of that energy are reflected back to the surface as the energy waves traverse different geological layers. Those seismic echoes or reflections give valuable information about the depth and arrangement of the formations, some of which hopefully contain oil or gas deposits.

A seismic survey is conducted by deploying an array of energy sources and an array of sensors or receivers in an area of interest. Typically, dynamite charges are used as sources for land surveys, and air guns are used for marine surveys. The sources are discharged in a predetermined sequence, sending seismic energy waves into the earth. The reflections from those energy waves or "signals" then are detected by the array of sensors. Each sensor records the amplitude of incoming signals over time at that particular location. Since the physical location of the sources and receivers is known, the time it takes for a reflection signal to travel from a source to a sensor is directly related to the depth of the formation that caused the reflection. Thus, the amplitude data from the array of sensors can be analyzed to determine the size and location of potential deposits.

This analysis typically starts by organizing the data from the array of sensors into common geometry gathers. That is, data from a number of sensors that share a common geometry are analyzed together. A gather will provide information about a particular spot or profile in the area being surveyed. Ultimately, the data will be organized into many different gathers and processed before the analysis is completed and the entire survey area mapped.

The types of gathers typically used include: common midpoint, where the sensors and their respective sources share a common midpoint; common source, where all the sensors share a common source; common offset, where all the sensors and their respective sources have the same separation or "offset"; and common receiver, where a number of sources share a common receiver. Common midpoint gathers are the most common gather today because they allow the measurement of a single point on a reflective subsurface feature from multiple source-receiver pairs, thus increasing the accuracy of the depth calculated for that feature.

The data in a gather are typically recorded or first assembled in the offset-time domain. That is, the amplitude data recorded at each of the receivers in the gather are assembled or displayed together as a function of offset, i.e., the distance of the receiver from a reference point, and as a function of time. The time required for a given signal to reach and be detected by successive receivers is a function of its velocity and the distance traveled. Those functions are referred to as kinematic travel time trajectories. Thus, at least in theory, when the gathered data are displayed in the offset-time domain, or "X-T" domain, the amplitude peaks corresponding to reflection signals detected at the gathered sensors should align into patterns that mirror the kinematic travel time trajectories. It is from those trajectories that one ultimately may determine an estimate of the depths at which formations exist.

A number of factors, however, make the practice of seismology and, especially, the interpretation of seismic data much more complicated than its basic principles. First, the reflected signals that indicate the presence of geological strata typically are mixed with a variety of noise.

The most meaningful signals are the so-called primary reflection signals, those signals that travel down to the reflective surface and then back up to a receiver. When a source is discharged, however, a portion of the signal travels directly to receivers without reflecting off of any subsurface features. In addition, a signal may bounce off of a subsurface feature, bounce off the surface, and then bounce off the same or another subsurface feature, one or more times, creating so-called multiple reflection signals. Other portions of the signal turn into noise as part of ground roll, refractions, and unresolvable scattered events. Some noise, both random and coherent, is generated by natural and man-made events outside the control of the survey.

All of this noise is occurring simultaneously with the reflection signals that indicate subsurface features. Thus, the noise and reflection signals tend to overlap when the survey data are displayed in X-T space. The overlap can mask primary reflection signals and make it difficult or impossible to identify patterns in the display upon which inferences about subsurface geology may be drawn. Accordingly, various mathematical methods have been developed to process seismic data in such a way that noise is separated from primary reflection signals.

Many such methods seek to achieve a separation of primary reflection signals and noise by transforming the data from the X-T domain to other domains. In other domains, such as the frequency-wavenumber (F-K) domain or the time-slowness (tau-P), there is less overlap between meaningful signal and noise data. Once the data are transformed, various mathematical filters are applied to the transformed data to separate noise from primary reflection signals, for example, by enhancing primary reflection signals or suppressing noise. The data then are inverse transformed back into the offset-time domain for further processing or interpretation.

For example, so-called Radon filters are commonly used to attenuate or remove multiple reflection signals. Such methods rely on Radon transformation equations to transform data from the offset-time (X-T) domain to the time-slowness (tau-P) where it can be filtered. More specifically, the X-T data are transformed along kinematic travel time trajectories having constant velocities and slownesses, where slowness p is defined as reciprocal velocity (or p=1/v).

Radon filters have been developed for use in connection with common source, common receiver, common offset, and common midpoint gathers. They include those based on linear slant-stack, parabolic, and hyperbolic kinematic travel time trajectories. The general case forward transformation equation used in Radon filtration processes, $R(p,\tau)[d(x,t)]$, is set forth below:

$$u(p, \tau) = \int_{-\infty}^{\infty} dx \int_{-\infty}^{\infty} dt\, d(x, t)\delta[f(t, x, \tau, p)]$$

(forward transformation)

where $u(p,\tau)$=transform coefficient at slowness p and zero-offset time $\tau$ $d(x,t)$=measured seismogram at offset x and two-way time t p=slowness t=two-way travel time $\tau$=two-way intercept time at p=0 x=offset $\delta$=Dirac delta function $f(t,x,\tau,p)$=forward transform function The forward transform function for linear slant stack kinematic travel time trajectories is as follows:

$$f(t, x, \tau, p) = t - \tau - px$$

where $$\delta[f(t, x, \tau, p)] = \delta(t - \tau - px)$$
$$= 1, \text{ when } t = \tau + px, \text{ and}$$
$$= 0, \text{ elsewhere.}$$

Thus, the forward linear slant stack Radon transformation equation becomes $$u(p, \tau) = \int_{-\infty}^{\infty} dx\, d(x, \tau + px)$$

The forward transform function for parabolic kinematic trajectories is as follows:

$$f(t, x, \tau, p) = t - \tau - px^2$$

where $$\delta[f(t, x, \tau, p)] = \delta(t - \tau - px^2)$$
$$= 1, \text{ when } t = \tau + px^2, \text{ and}$$
$$= 0, \text{ elsewhere.}$$

Thus, the forward parabolic Radon transformation equation becomes $$u(p, \tau) = \int_{-\infty}^{\infty} dx\, d(x, \tau + px^2)$$

The forward transform function for hyperbolic kinematic travel time trajectories is as follows:

$$f(t, x, \tau, p) = t - \sqrt{\tau^2 + p^2 x^2}$$

where $$\delta[f(t, x, \tau, p)] = \delta\left(t - \sqrt{\tau^2 + p^2 x^2}\right)$$
$$= 1, \text{ when } t = \sqrt{\tau^2 + p^2 x^2}, \text{ and}$$
$$= 0, \text{ elsewhere.}$$

Thus, the forward hyperbolic Radon transformation equation becomes $$u(p, \tau) = \int_{-\infty}^{\infty} dx\, d\left(x, \sqrt{\tau^2 + p^2 x^2}\right)$$

A general case inverse Radon transformation equation is set forth below:

$$d(x, t) = \int_{-\infty}^{\infty} dp \int_{-\infty}^{\infty} d\tau\, \rho(\tau) * u(p, \tau)\delta[g(t, x, \tau, p)]$$

(inverse transformation)

where $g(t,x,\tau,p)$=inverse transform function, and $\rho(\tau)*$=convolution of rho filter.

The inverse transform function for linear slant stack kinematic trajectories is as follows:

$$g(t,x,\tau,p) = \tau - t + px$$

Thus, when $\tau=t-px$, the inverse linear slant stack Radon transformation equation becomes $$d(x, t) = \int_{-\infty}^{\infty} dp\, \rho(\tau) * u(p, t - px)$$

The inverse transform function for parabolic trajectories is as follows:

$$g(t,x,\tau,p) = \tau - t + px^2$$

Thus, when $\tau=t-px^2$, the inverse linear slant stack Radon transformation equation becomes $$d(x, t) = \int_{-\infty}^{\infty} dp\, \rho(\tau) * u(p, t - px^2)$$

The inverse transform function for hyperbolic trajectories is as follows:

$$g(t,x,\tau,p) = \tau - \sqrt{t^2 - p^2 x^2}$$

Thus, when $\tau=\sqrt{t^2-p^2x^2}$, the inverse hyperbolic Radon transformation equation becomes $$d(x, t) = \int_{-\infty}^{\infty} dp\, \rho(\tau) * u\left(p, \sqrt{t^2 - p^2 x^2}\right)$$

The choice of which form of Radon transformation preferably is guided by the travel time trajectory at which signals of interest in the data are recorded. Common midpoint gathers, because they offer greater accuracy by measuring a single point from multiple source-receiver pairs, are preferred over other types of gathers. Primary reflection signals in a common midpoint gather generally will have hyperbolic kinematic trajectories. Thus, it would be preferable to use hyperbolic Radon transforms.

To date, however, Radon transformations based on linear slant stack and parabolic trajectories have been more commonly used. The transform function for hyperbolic trajectories contains a square root whereas those for linear slant stack and parabolic transform functions do not. Thus, the computational intensity of hyperbolic Radon transformations has in large part discouraged their use in seismic processing.

It has not been practical to accommodate the added complexity of hyperbolic Radon transformations because the computational requirements of conventional processes are already substantial. For example, such prior art Radon methods typically first process the data to compensate for the increase in travel time as sensors are further removed from the source. This step is referred to as normal moveout or "NMO" correction. It is designed to eliminate the differences in time that exist between the primary reflection signals recorded at close-in receivers, i.e., at near offsets, and those recorded at remote receivers, i.e., at far offsets.

NMO correction involves a least-mean-squares ("LMS") energy minimization calculation. Forward and inverse Radon transforms also are not exact inverses of each other. Accordingly, an additional LMS calculation, conjugate gradient and/or sparsity constraints are often used in the transformation. Those calculations in general and, especially LMS analyses, are complex and require substantial computing time, even on advanced computer systems.

Moreover, a typical seismic survey may involve hundreds of sources and receivers, thus generating tremendous quantities of raw data. The data may be subjected to thousands of different data gathers. Each gather is subjected not only to filtering processes as described above, but in all likelihood to many other enhancement processes as well. For example, data are typically processed to compensate for the diminution in amplitude as a signal travels through the earth ("amplitude balancing"). Then, once the individual gathers have been filtered, they must be "stacked", or compiled with other gathers, and subjected to further processing in order to make inferences about subsurface formations. Seismic processing by prior art Radon methods, therefore, requires substantial and costly computational resources, and there is a continuing need for more efficient and economical processing methods.

For example, French Pat. 2,801,387 of B. Fernand ("Fernand") relates generally to processing of seismic data and specifically to methods that utilize a determination of residual dynamic corrections (i.e., residual "normal move out" or "NMO" corrections). It generally discloses a method wherein amplitude data in the X-T domain are transformed into the tau-P domain using a parabolic Radon transformation. A filter is defined and applied in the tau-P domain which attenuates all data, including the transformed primary signals, below a defined slowness value $p_{mute}$. The data that remain after attenuating the primary reflection signals contain a substantial portion of the signals corresponding to multiple reflections. The unmuted data are then transformed back into offset-time space and are subtracted from the original data in the gather. The subtraction process removes the multiple reflection signals from the data gather, leaving the primary reflection signals more readily apparent and easier to interpret. It will be appreciated, however, that such prior art Radon filters are computationally intense, in large part because they rely on NMO correction, and rely on less accurate parabolic Radon transformations instead of hyperbolic transformations.

The velocity at which primary reflection signals are traveling, what is referred to as the stacking velocity, is used in various analytical methods that are applied to seismic data. For example, it is used in determining the depth and lithology or sediment type of geological formations in the survey area. It also is used various seismic attribute analyses. A stacking velocity function may be determined by what is referred to as a semblance analysis. Which such methods have provided reasonable estimations of the stacking velocity function for a data set, given the many applications based thereon, it is desirable to define the stacking velocity function as precisely as possible.

An object of this invention, therefore, is to provide a method for processing seismic data that more effectively removes unwanted noise from meaningful reflection signals.

It also is an object to provide such methods based on hyperbolic Radon transformations.

Another object of this invention is to provide methods for removal of noise from seismic data that are comparatively simple and require relatively less computing time and resources.

Yet another object is to provide methods for more accurately defining the stacking velocity function for a data set.

It is a further object of this invention to provide such methods wherein all of the above-mentioned advantages are realized.

Those and other objects and advantages of the invention will be apparent to those skilled in the art upon reading the following detailed description and upon reference to the drawings.

SUMMARY OF THE INVENTION

The subject invention provides for methods of processing seismic data to remove unwanted noise from meaningful reflection signals indicative of subsurface formations. The methods comprise the steps of obtaining field records of seismic data detected at a number of seismic receivers in an area of interest. The seismic data comprise amplitude data recorded over time by each of the receivers and contain both primary reflection signals and unwanted noise events. The amplitude data are assembled into common geometry gathers in an offset-time domain.

The amplitude data are then transformed from the offset-time domain to the time-slowness domain using a Radon transformation. Preferably, the Radon transformation is applied within defined slowness limits $p_{min}$ and $p_{max}$, where $p_{min}$ is a predetermined minimum slowness and $p_{max}$ is a predetermined maximum slowness, and an offset weighting factor $x^n$ is applied to the amplitude data, wherein $0<n<1$.

Such Radon transformations include the following continuous transform equation, and discrete versions thereof that approximate the continuous transform equation:

$$u(p, \tau) = \int_{-\infty}^{\infty} dx \int_{-\infty}^{\infty} dt\, d(x, t) x^n \delta[f(t, x, \tau, p)]$$

Radon transformations based on linear slant stack, parabolic, and other non-hyperbolic kinematic travel time trajectories may be used, but those based on hyperbolic Radon kinematic trajectories are preferred. Suitable hyperbolic Radon transformations include the following continuous transform equation, and discrete versions thereof that approximate the continuous transform equation:

$$u(p, \tau) = \int_{-\infty}^{\infty} dx\, x^n d\left(x, \sqrt{\tau^2 + p^2 x^2}\right)$$

A high resolution Radon transformation preferably is used, where the transformation is performed according to an index j of the slowness set and a sampling variable $\Delta p$; wherein $$j = \frac{p_{max} - p_{min} + 1\mu sec/m}{\Delta p},$$

$\Delta p$ is from about 0.5 to about 4.0 μsec/m, $p_{max}$ is a predetermined maximum slowness, and $p_{min}$ is a predetermined minimum slowness.

The coherent noise content of the transformed data is then enhanced, and the primary reflection signal content diminished by filtering at least a subset of the transformed data. All, or just a subset of the transformed data may be filtered. Preferably, the transformed data are filtered by defining a slowness high-pass region to enhance the high slowness coherent noise content and to diminish the primary reflection signal content of the transformed data. This generates filtered data having enhanced coherent noise content.

After filtering, the filtered data are inverse transformed from the time-slowness domain back to the offset-time domain using an inverse Radon transformation, and, if necessary, an inverse of the offset weighting factor $p^n$ is applied to the inverse transformed data, wherein 0<n<1. Such Radon transformations include the following continuous inverse transform equation, and discrete versions thereof that approximate the continuous inverse transform equation:

$$d(x, t) = \int_{-\infty}^{\infty} dp \int_{-\infty}^{\infty} d\tau\, p^n \rho(\tau) * u(p, \tau) \delta[g(t, x, \tau, p)]$$

Suitable hyperbolic inverse Radon transformations include the following continuous inverse transform equation, and discrete versions thereof that approximate the continuous inverse transform equation:

$$d(x, t) = \int_{-\infty}^{\infty} dp\, p^n \rho(\tau) * u\left(p, \sqrt{t^2 - p^2 x^2}\right)$$

The amplitude data for the filtered data are thereby restored.

The restored amplitude data of the filtered data are then subtracted from the originally assembled amplitude data. In this manner, the coherent noise content of the assembled amplitude data is diminished and the primary reflection signal content enhanced. The processed and filtered data may then be subject to further processing by which inferences about the subsurface geology of the survey area may be made.

It will be appreciated that primarily because an offset weighting factor and its inverse may be used, because the Radon transformation may be limited, and because more complex mathematical operations required by prior art processes, such as NMO correction, are not required, the novel methods require less total computation time and resources. At the same time, because overall the novel methods are computationally less intensive, sampling variables used in the transformations and semblance analyses may be set much finer than are typically used in prior art processes, thereby offering higher resolution and increased accuracy. Consequently, even though hyperbolic Radon transformations heretofore generally have been avoided because of their greater complexity relative to linear slant stack and parabolic Radon transformations, the novel processes are able to more effectively utilize hyperbolic Radon transformations and take advantage of the greater accuracy they can provide, especially when applied to common midpoint geometry gathers. Ultimately, the increased accuracy and efficiency of the novel processes enhances the accuracy of surveying underground geological features and, therefore, the likelihood of accurately locating the presence of oil and gas deposits.

The methods of the subject invention preferably are implemented by computers and other conventional data processing equipment. Accordingly, the subject invention also provides for methods of processing seismic data in a computer system and for generating an output signal to provide a display of the processed data and apparatus for processing seismic data. Because the methods of the subject invention remove noise that otherwise might interfere with accurate interpretation of seismic data, the subject invention also provides for methods for selecting a drilling site which comprises processing and analyzing the seismic data to search for subsurface formations of interest and drilling in the location of interest.

DESCRIPTION OF ILLUSTRATIVE EMBODIMENTS

The subject invention is directed to improved methods for processing seismic data to remove unwanted noise from meaningful reflection signals and for more accurately determining the stacking velocity function for a set of seismic data.

Obtaining and Preparing Seismic Data for Processing

More particularly, the novel methods comprise the step of obtaining field records of seismic data detected at a number of seismic receivers in an area of interest. The seismic data comprise amplitude data recorded over time and contain both primary reflection signals and unwanted noise events.

Figure 1A:
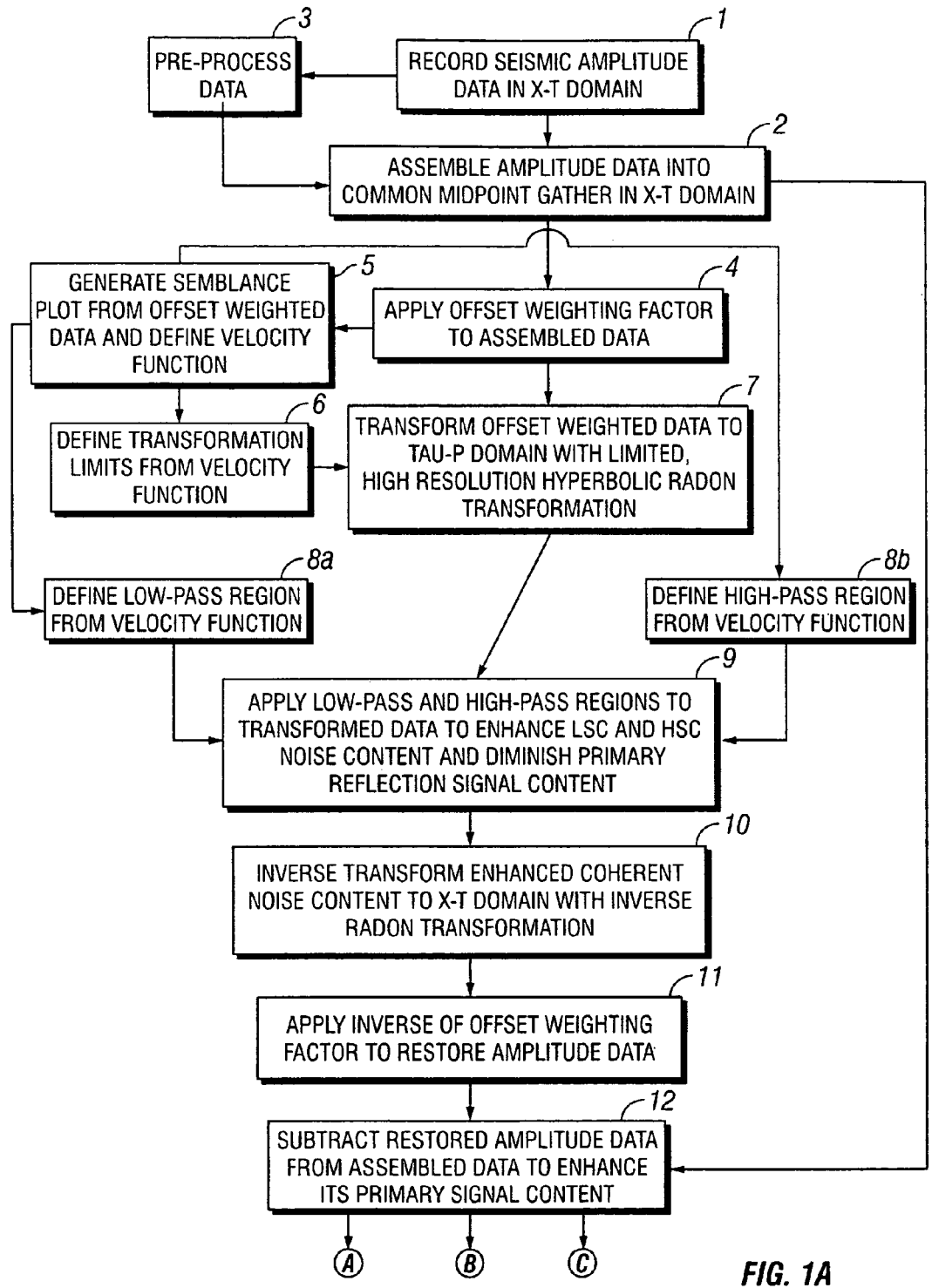
FIGS. 1A and 1B are a schematic diagram of a preferred embodiment of the methods of the subject invention showing a sequence of steps for enhancing the primary reflection signal content of seismic data and for attenuating unwanted noise events, thereby rendering it more indicative of subsurface formations.
Figure 1B:
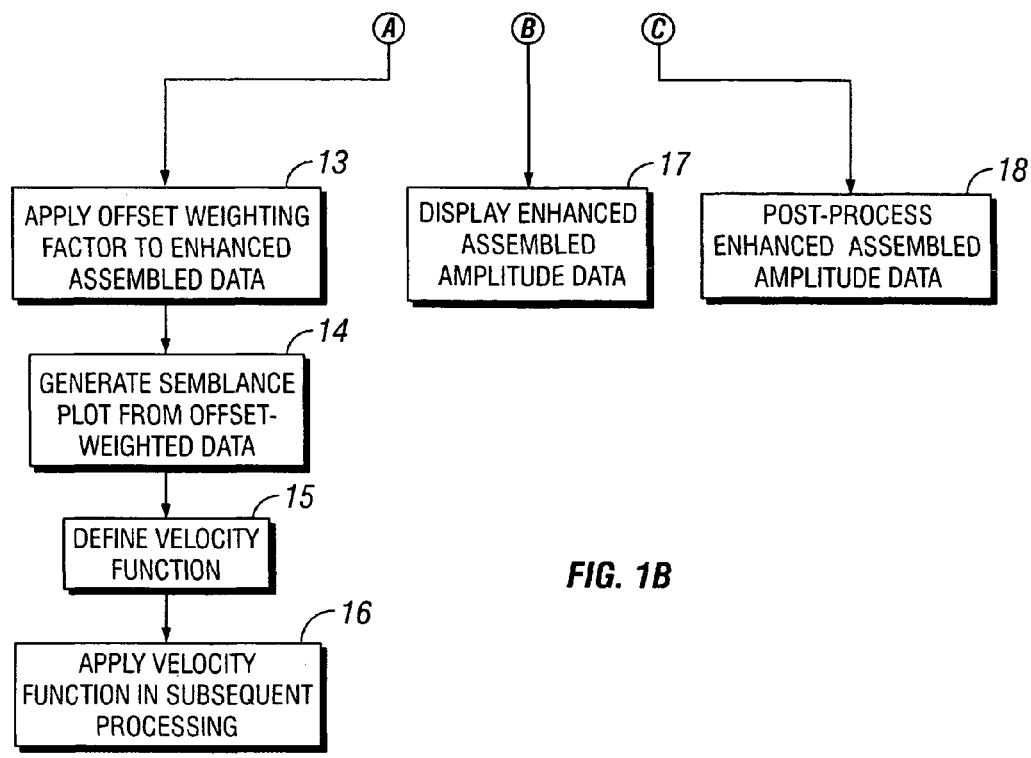

By way of example, a preferred embodiment of the methods of the subject invention is shown in the flow chart of FIG. 1. As shown therein in step 1, seismic amplitude data are recorded in the offset-time domain. For example, such data may be generated by a seismic survey shown schematically in FIG. 2.

Figure 2:
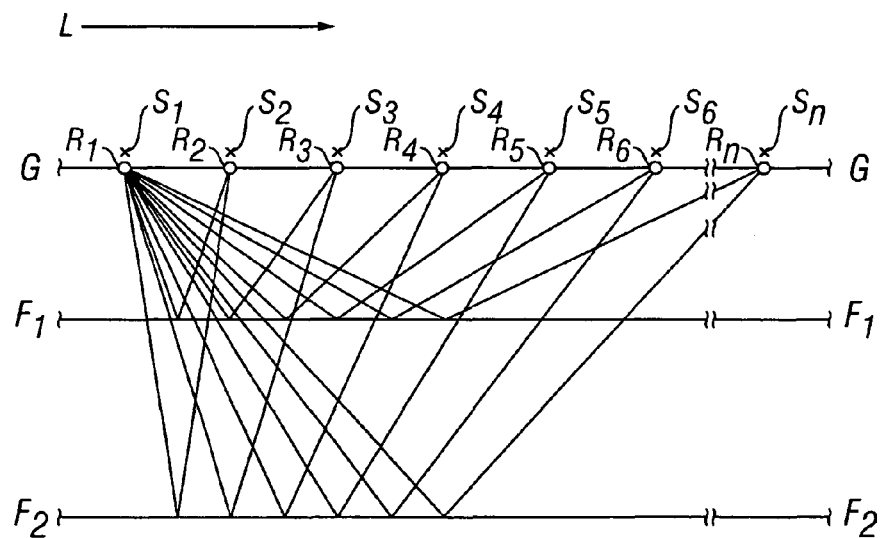
FIG. 2 is a schematic diagram of a two-dimensional seismic survey in which field records of seismic data are obtained at a number of seismic receivers along a profile of interest.

The seismic survey shown in FIG. 2 is a two-dimensional survey in offset-time (X-T) space along a seismic line of profile L. A number of seismic sources $S_n$ and receivers $R_n$ are laid out over a land surface G along profile L. The seismic sources $S_n$ are detonated in a predetermined sequence. As they are discharged, seismic energy is released as energy waves. The seismic energy waves or "signals" travel downward through the earth where they encounter subsurface geological formations, such as formations $F_1$ and $F_2$ shown schematically in FIG. 2. As they do, a portion of the signal is reflected back upwardly to the receivers $R_n$. The paths of such primary reflection signals from $S_1$ to the receivers $R_n$ are shown in FIG. 2.

The receivers $R_n$ sense the amplitude of incoming signals and digitally record the amplitude data over time for subsequent processing. Those amplitude data recordations are referred to as traces. It will be appreciated that the traces recorded by receivers $R_n$ include both primary reflection signals of interest, such as those shown in FIG. 2, and unwanted noise events.

It also should be understood that the seismic survey depicted schematically in FIG. 2 is a simplified one presented for illustrative purposes. Actual surveys typically include a considerably larger number of sources and receivers. Further, the survey may be taken on land or over a body of water. The seismic sources usually are dynamite charges if the survey is being done on land, and geophones are used. Air guns are typically used for marine surveys along with hydrophones. The survey may also be a three-dimensional survey over a surface area of interest rather than a two-dimensional survey along a profile as shown.

Figure 3:
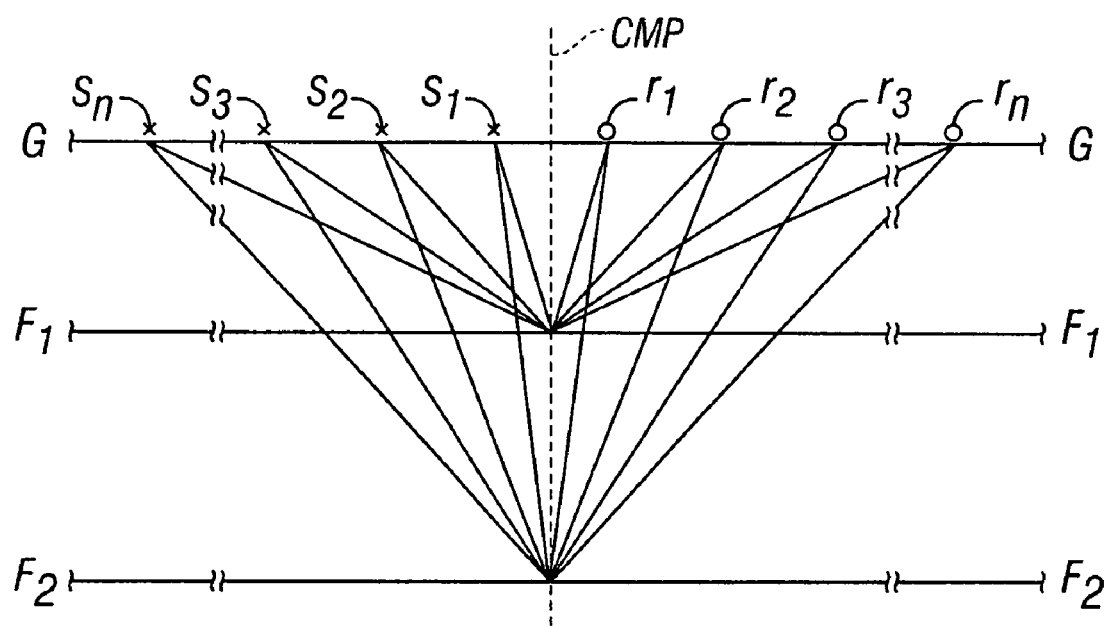
FIG. 3 is a schematic diagram of a seismic survey depicting a common midpoint geometry gather.

In accordance with the subject invention, the amplitude data are assembled into common geometry gathers in an offset-time domain. For example, in step 2 of the preferred method of FIG. 1, the seismic amplitude data are assembled in the offset-time domain as a common midpoint gather. That is, as shown schematically in FIG. 3, midpoint CMP is located halfway between source $s_1$ and receiver $r_1$. Source $s_2$ and receiver $r_2$ share the same midpoint CMP, as do all pairs of sources $s_n$ and receivers $r_n$ in the survey. Thus, it will be appreciated that all source $s_n$ and receiver $r_n$ pairs are measuring single points on subsurface formations $F_n$. The traces from each receiver $r_n$ in those pairs are then assembled or "gathered" for processing.

It will be appreciated, however, that other types of gathers are known by workers in the art and may be used in the subject invention. For example, the seismic data may be assembled into common source, common receiver, and common offset gathers and subsequently processed to enhance meaningful signal content and attenuate noise.

It will be appreciated that the field data may be processed by other methods for other purposes before being processed in accordance with the subject invention as shown in step 3 of FIG. 1. The appropriateness of first subjecting the data to amplitude balancing or other conventional pre-processing, such as spherical divergence correction and absorption compensation, will depend on various geologic, geophysical, and other conditions well known to workers in the art. The methods of the subject invention may be applied to raw, unprocessed data or to data preprocessed by any number of well-known methods.

As will become apparent from the discussion that follows, the novel methods preferably do not contemplate the use of NMO correction as generally the overall efficiency of the novel processes is improved thereby. NMO correction requires an LMS analysis, and typically is followed by another LMS analysis in the Radon transformation, both of which require a large number of computations. It also is possible to avoid the loss of resolution caused by the use of coarse sampling variables in NMO correcting.

Moreover, when the Radon transformation is applied within defined slowness limits $p_{min}$ and $p_{max}$ as described herein, it is important that the amplitude be uncorrected for normal moveout. That is, the amplitude data should not be NMO corrected, or if preprocessed by a method that relies on NMO correction, the NMO correction should be reversed, prior to transformation of the data. Otherwise, it is not practical to design and apply a lower limit $p_{min}$ to the transformation that will preserve near trace multiple reflection signals.

If the Radon transformation is not limited within defined slowness limits, however, the novel methods may be applied to data which have been NMO corrected should such correction be desired or necessary. In particular, methods utilizing an offset weighting factor and a high resolution Radon transformation as described herein may be applied to data which have been NMO corrected.

Transformation of Data

Once the amplitude data are assembled, the methods of the subject invention further comprise the step of transforming the assembled amplitude data from the offset-time domain to the time-slowness domain using a Radon transformation. Preferably, an offset weighting factor $x^n$ is applied to the amplitude data to equalize amplitudes in the amplitude data across offset values and to emphasize normal amplitude moveout differences between desired reflection signals and unwanted noise, wherein $0<n<1$.

It also is preferred that the Radon transformation be applied within defined slowness limits $p_{min}$ and $p_{max}$, where $p_{min}$ is a predetermined minimum slowness and $p_{max}$ is a predetermined maximum slowness which will preserve multiple reflection signals and other coherent noise. By thus limiting the transformation, it is more efficient and effective, yet coherent noise is preserved. The slowness limits $p_{min}$ and $p_{max}$ preferably are determined by reference to a velocity function of the primary reflection signals derived by performing a semblance analysis or a pre-stack time migration analysis on the amplitude data, or if conducted in the tau-P domain, by reference to a slowness function of the primary reflection signals.

The transformation also is preferably performed with a high resolution Radon transformation having an index j of the slowness set and a sampling variable $\Delta p$, wherein $$j = \frac{p_{max} - p_{min} + 1 \mu\text{sec}/\text{m}}{\Delta p},$$

$\Delta p$ is from about 0.5 to about 4.0 μsec/m, $p_{max}$ is a predetermined maximum slowness, and $p_{min}$ is a predetermined minimum slowness. $\Delta p$ preferably is from about 0.5 to about 3.0 μsec/m, and more preferably, is from about 0.5 to about 2.0 μsec/m. A $\Delta p$ of about 1.0 μsec/m is most preferably used. This provides a finer resolution transformation and, therefore, better resolution in the filtered data.

For example, in step 4 of the exemplified method of FIG. 1, an offset weighting factor is applied to the amplitude data that were assembled in step 2. A semblance analysis is performed on the offset weighted amplitude data to generate a semblance plot and a velocity function, as shown in step 5. Then, in step 6 the velocity function is used to define the slowness limits $p_{min}$ and $p_{max}$ that will be applied to the transformation. The offset weighted data are then transformed with a high resolution hyperbolic Radon transformation and according to the transform limits in step 7. It will be appreciated, however, that the Radon transformation of the offset weighted data may be may be based on linear slant stack, parabolic, or other non-hyperbolic kinematic travel time trajectories.

A general mathematical formulation utilizing the offset weighting factor and encompassing the linear, parabolic, and hyperbolic forward Radon transforms is as follows:

$$u(p, \tau) = \int_{-\infty}^{\infty} dx \int_{-\infty}^{\infty} dt\, d(x, t) x^n \delta[f(t, x, \tau, p)] \quad (1)$$

(forward transformation)

where
 $u(p,\tau)$=transform coefficient at slowness p and zero-offset time $\tau$
 $d(x,t)$=measured seismogram at offset x and two-way time t
 $x^n$=offset weighting factor ($0<n<1$)
 $\delta$=Dirac delta function
 $f(t,x,\tau,p)$=forward transform function The forward transform function for hyperbolic trajectories is as follows:

$$f(t,x,\tau,p) = t - \sqrt{\tau^2 + p^2 x^2}$$

Thus, when $t=\sqrt{\tau^2+p^2x^2}$, the forward hyperbolic Radon transformation equation becomes $$u(p, \tau) = \int_{-\infty}^{\infty} dx\, x^n d\left(x, \sqrt{\tau^2 + p^2 x^2}\right)$$

The forward transform function for linear slant stack kinematic trajectories is as follows:

$$f(t,x,\tau,p) = t - \tau - px$$

Thus, when $t=\tau+px$, the forward linear slant stack Radon transformation equation becomes $$u(p, \tau) = \int_{-\infty}^{\infty} dx\, x^n d(x, \tau + px)$$

The forward transform function for parabolic trajectories is as follows:

$$f(t,x,\tau,p) = t - \tau - px^2$$

Thus, when $t=\tau+px^2$, the forward parabolic Radon transformation equation becomes $$u(p, \tau) = \int_{-\infty}^{\infty} dx\, x^n d(x, \tau + px^2)$$

The function $f(t,x,\tau,p)$ allows kinematic travel time trajectories to include anisotropy, P-S converted waves, wave-field separations, and other applications of current industry that are used to refine the analysis consistent with conditions present in the survey area. Although hyperbolic travel time trajectories represent more accurately reflection events for common midpoint gathers in many formations, hyperbolic Radon transformations to date have not been widely used. Together with other calculations necessary to practice prior art processes, the computational intensity of hyperbolic Radon transforms tended to make such processing more expensive and less accurate. Hyperbolic Radon transformations, however, are preferred in the context of the subject invention because the computational efficiency of the novel processes allows them to take advantage of the higher degree of accuracy provided by hyperbolic travel time trajectories.

As noted, the Radon transformations set forth above in Equation 1 incorporate an offset weighting factor $x^n$, where x is offset. The offset weighting factor emphasizes amplitude differences that exist at increasing offset, i.e., normal amplitude moveout differences between desired primary reflections and multiples, linear, and other noise whose time trajectories do not fit a defined kinematic function. Since the offset is weighted by a factor n that is positive, larger offsets receive preferentially larger weights. The power n is greater than zero, but less than 1. Preferably, n is approximately 0.5 since amplitudes seem to be preserved better at that value. While the power n appears to be robust and insensitive, it probably is data dependent to some degree. The use and advantages of applying offset weighting factors in Radon transformations are described in further detail in U.S. Pat. No. 6,691,039 to L. Wood entitled "Removal of Noise From Seismic Data Using Improved Radon Transformations," the disclosure of which is incorporated herein by reference.

While the application of an offset weighting factor as described above is preferred, it will be appreciated that other methods of amplitude balancing may be used in the methods of the subject invention. For example, automatic gain control (AGC) operators may be applied. A gain control operator may be applied where the gain control operator is the inverse of the trace envelope for each trace as disclosed in U.S. Pat. No. 5,189,644 to Lawrence C. Wood and entitled "Removal of Amplitude Aliasing Effect From Seismic Data".

As will be appreciated by workers in the art, execution of the transformation equations discussed above involve numerous calculations and, as a practical matter, must be executed by computers if they are to be applied to the processing of data as extensive as that contained in a typical seismic survey. Accordingly, the transformation equations, which are expressed above in a continuous form, preferably are translated into discrete transformation equations which approximate the solutions provided by continuous transformation equations and can be encoded into and executed by computers.

For example, assume a seismogram $d(x,t)$ contains $2L+1$ traces each having N time samples, i.e., $l = 0, \pm 1, \ldots, \pm L$ and $k = 1, \ldots, N$ and that $x_{-L} < x_{-L+1} < \ldots < x_{L-1} < x_L$ A discrete general transform equation approximating the continuous general transform Equation 1 set forth above, therefore, may be derived as set forth below:

$$u(p, \tau) = \sum_{l=-L}^{L} \sum_{k=1}^{N} d(x_l, t_k) x_l^n \delta[f(t_k, x_l, \tau, p)] \Delta x_l \Delta t_k \quad (2)$$

where $$\Delta x_l = \frac{x_{l+1} - x_{l-1}}{2} \text{ for } l = 0, \pm 1, \ldots, \pm(L-1)$$

-continued $$\Delta x_L = x_L - x_{L-1}$$

$$\Delta x_{-L} = x_{-L+1} - x_{-L}$$

$$\Delta t_k = \frac{t_{k+1} - t_{k-1}}{2} \text{ for } k = 2, \ldots, N-1$$

$$\Delta t_1 = t_2 - t_1$$

$$\Delta t_N = t_N - t_{N-1}$$

By substituting the hyperbolic forward transform function set forth above, the discrete general forward transformation Equation 2 above, when $t=\sqrt{\tau^2+p^2x^2}$, may be reduced to the discrete transformation based on hyperbolic kinematic travel time trajectories that is set forth below:

$$u(p, \tau) = \sum_{l=-L}^{L} x_l^n d\left(x_l, \sqrt{\tau^2 + p^2 x_l^2}\right) \Delta x_l$$

Similarly, when $t=\tau+px$, the discrete linear slant stack forward transformation derived from general Equation 2 is as follows:

$$u(p, \tau) = \sum_{l=-L}^{L} x_l^n d(x_l, \tau + px_l) \Delta x_l$$

When $t=\tau+px^2$, the discrete parabolic forward transformation is as follows:

$$u(p, \tau) = \sum_{l=-L}^{L} x_l^n d(x_l, \tau + px_l^2) \Delta x_l$$

Those skilled in the art will appreciate that the foregoing discrete transformation Equation 2 sufficiently approximates continuous Equation 1, but still may be executed by computers in a relatively efficient manner. For that reason, the foregoing equation and the specific cases derived therefrom are preferred, but it is believed that other discrete transformation equations based on Radon transformations are known, and still others may be devised by workers of ordinary skill for use in the subject invention.

As noted, the Radon transformation preferably is applied within slowness transformation limits $p_{min}$ and $p_{max}$ which are set such that multiple reflection signals and other coherent noise are preserved in the transformed data. As noted above, however, when the Radon transformation is so limited it is important that the assembled amplitude data be uncorrected for normal moveout. If the data are corrected for normal moveout, as will become apparent from the discussion that follows, it is not practical to design and apply a lower limit $p_{min}$ to the transformation that will preserve near trace multiple reflection signals.

The transformation slowness limits are defined by reference to the velocity function for primary reflection signals as determined, for example, through the semblance analysis described above. High and low transformation limits, i.e., a maximum velocity ($v_{max}$) and minimum velocity ($v_{min}$), are defined on either side of the velocity function. The velocity limits then are converted into slowness limits $p_{min}$ and $p_{max}$ which will limit the slowness domain for the transformation of the data from the offset-time domain to the tau-P domain, where $p_{min}=1/v_{max}$ and $p_{max}=1/v_{min}$. Alternately, the slowness limits $p_{min}$ and $p_{max}$ may be defined by reference to the slowness function for primary reflection signals, as determined, for example, by a semblance analysis or a pre-stack migration analysis conducted in the tau-P domain.

When the semblance analysis is performed on amplitude data that has been offset weighted, as described above, appropriate slowness limits $p_{min}$ and $p_{max}$ may be more accurately determined and, therefore, a more efficient and effective transformation may be defined. It will be appreciated, however, that the semblance analysis may be performed on data that has not been offset weighted. Significant improvements in computational efficiency still will be achieved by the subject invention.

In general, $p_{max}$ is greater than the slowness of reflection signals from the shallowest reflective surface of interest. In marine surveys, however, it typically is desirable to record the water bottom depth. Thus, $p_{max}$ may be somewhat greater, i.e., greater than the slowness of reflective signals through water in the area of interest. The lower transformation limit, $p_{min}$, generally is less than the slowness of reflection signals from the deepest reflective surface of interest.

Thus, although specific values will depend on the data recorded in the survey, $p_{min}$ generally will be less than about 165 μsec/m and, even more commonly, less than about 185 μsec/m. Similarly, $p_{max}$ generally will be greater than about 690 μsec/m, and even more commonly, greater than about 655 μsec/m for marine surveys. For land surveys, $p_{max}$ generally will be greater than about 3.125 μsec/m, and even more commonly, greater than about 500 μsec/m.

Since most multiple reflection signals will transform at greater slownesses than primary reflection signals when data are not NMO corrected, including those having the greatest amplitudes, greater care must be taken in setting an upper limit on the transformation so as to ensure that the multiple reflection signals are preserved in the transformation. The upper transformation limit $p_{max}$, therefore, typically will be set somewhat above the slownesses of the pertinent reflection signals, such as within 20% above. The lower transformation limit may be set below, but more closely to the slowness of the pertinent reflection signals as fewer multiples will transform at slownesses less than the primary reflection signals. Thus, the lower transformation limit $p_{min}$ typically will be set within 10% below. It will be understood, of course, that the tolerances within which the transformation limits may be optimally set will vary depending on the particular seismic data being processed and its noise characteristics.

It will be appreciated that by limiting the transformation, the novel processes provide increased efficiency by reducing the amount of data transformed while still preserving multiple reflection signals during the transformation. Prior art Radon methods do not incorporate any effective limits to their transformations. As a practical matter an upper limit necessarily exists, but it is typically well beyond the limits of the data and, a fortiori, even further beyond the slowness of the shallowest reflective surface of interest. Prior art methods prefer to transform any and all data that transform into higher slowness regions.

Moreover, prior art radon transformations do not apply a lower slowness limit to the transformation. Indeed, when the transformations operate on data which are NMO corrected, it is not possible as a practical matter to apply a lower slowness limit to the transformation. When data are NMO corrected, multiple reflection signals recorded by receivers close to the gather reference point ("near trace multiples") will transform at or very near zero slowness. Thus, any lower slowness limit to the transformation likely would decimate near trace multiple signals, and therefore, they would not be subtracted from the original data gather. When the data are not subject to NMO correction, as contemplated by the subject invention, however, signals for near trace multiples do not transform at or near zero slowness, i.e., they transform above a definable $p_{min}$. It is possible, therefore, to apply a lower limit to the transformation that will increase the computational efficiency of the transformation while still preserving multiple reflection signals.

As noted, the novel processes preferably incorporate high resolution Radon transformations. That is, preferably the transformation is performed according to an index j of the slowness set and a sampling variable $\Delta p$, wherein $$j = \frac{p_{max} - p_{min} + 1\mu\sec/m}{\Delta p},$$

$p_{max}$ is a predetermined maximum slowness, and $p_{min}$ is a predetermined minimum slowness. This provides finer resolution transformations and, therefore, better resolution in the filtered data.

More specifically, $\Delta p$ typically is from about 0.5 to about 4.0 μsec/m. $\Delta p$ preferably is from about 0.5 to about 3.0 μsec/m, and more preferably, is from about 0.5 to about 2.0 μsec/m. A $\Delta p$ of about 1.0 μsec/m is most preferably used. Slowness limits $p_{min}$ and $p_{max}$, which are used to determine the index j of the slowness set, are generally set in the same manner as the slowness limits that preferably are applied to limit the transformation as described above. That is, $p_{max}$ generally is greater than the slowness of reflection signals from the shallowest reflective surface of interest, although in marine surveys it may be somewhat greater, i.e., greater than the slowness of reflective signals through water in the area of interest, so as to record the water bottom depth. The minimum slowness limit, $p_{min}$, generally is less than the slowness of reflection signals from the deepest reflective surface of interest. Typically, the minimum limit $p_{min}$ will be set within 10% below, and the maximum limit $p_{max}$ will be set within 20% above the slownesses of the pertinent reflection signals. The specific values for the slowness limits $p_{min}$ and $p_{max}$ will depend on the data recorded in the survey, but typically, therefore, j preferably is from about 125 to about 1000, most preferably from about 250 to about 1000.

High resolution Radon transformations also are preferred because they can provide increased resolution and accuracy without reliance on computationally intensive processing steps, such as trace interpolation, LMS analysis in the transformation, or NMO correction of the data prior to transformation, which also requires a LMS analysis. Moreover, it is possible to avoid the loss of resolution caused by the use of coarse sampling variables in NMO correcting, i.e., $\Delta t$ values in the range of 20-40 milliseconds and $\Delta v$ values of from about 15 to about 120 m/sec. The use and advantages of high resolution Radon transforms are described in further detail in Published U.S. Application No. 2004/0049348 of L. Wood entitled "Removal of Noise From Seismic Data Using High Resolution Radon Transformations." the disclosure of which is incorporated herein by reference.

Thus, the novel methods preferably utilize high resolution Radon filters. It will be appreciated, however, that lower resolution Radon filters can be used if desired. Such lower resolution Radon processes typically set $\Delta p$ at values in the range of 4-24 μsec/m, and the index j of the slowness set usually is equal to the fold of the offset data, which typically ranges from about 20 to about 120.

Filtering of Transformed Data

The methods of the subject invention further comprise filtering at least a subset of the transformed data to enhance the multiple reflection signal and other coherent noise content and diminish the primary reflection signal content of the transformed data. Preferably, all of the transformed data are filtered as that will provide the greatest enhancement of coherent noise content and, ultimately, more effective removal of coherent noise from meaningful reflection signals. It will be appreciated, however, that only a subset of the transformed data, such as transformed data within defined tau limits, may be filtered. Depending on the characteristics of the seismic data which are collected, a particular segment or segments of the data may have particularly high coherent noise content. Thus, if desired, only particularly noisy segments may be filtered. While such windowing may reduce the overall efficacy of the filtering process, such drawbacks may be offset by benefits derived from decreasing the computational intensity of the process. Also, windowing may provide a relatively efficient means for providing an initial analysis of the data.

The transformed data may be filtered by any suitable designed pass regions that will enhance the coherent noise content of the transformed data while diminishing their primary reflection signal content. Generally, however, the definition of a slowness high-pass region will be preferred. The high-pass region is defined to enhance the high slowness coherent noise content and to diminish the primary reflection signal content of the transformed data, thus generating filtered data having enhanced high slowness coherent noise content.

The limits for a slowness high-pass region typically will be defined by reference to the velocity or slowness function of the primary reflection signals and may be time variant, all as described in further detail below. When the transformed data have been NMO corrected prior to transformation, however, the slowness of the primary reflections should be essentially zero and so the limit for the high-pass region typically will be set relatively close to zero slowness. Moreover, since the slowness function for primary reflection signals should be substantially time invariant, i.e., essentially zero across all times, the efficacy of a slowness high-pass region may not be improved substantially by making it time variant as in more preferred methods where the transformed data are uncorrected for normal moveout.

If the transformed data are uncorrected for normal moveout, however, they preferably are filtered by defining both a slowness low-pass and a slowness high-pass region. The low-pass region is defined to enhance the low slowness coherent noise content and to diminish the primary reflection signal content of the transformed data, thus generating filtered data also having enhanced low slowness coherent noise content.

It also will be appreciated that as a practical matter it is not possible to apply a slowness low-pass region when the transformed data have been NMO corrected. Primary reflection signals transform at zero slowness when the data have been NMO corrected. Thus, the application of any low-pass limit above zero-slowness would not attenuate the primary signals. They would be preserved in the tau-P domain along with multiples and, therefore, subtracted along with the multiples from the original data set in the time-space domain. In essence, the primary signals would be filtered out by any slowness low-pass filter when data have been corrected for normal moveout.

Preferably, one or both of the high-pass and low-pass regions are time variant. The low-pass and high-pass regions preferably are determined by performing a semblance analysis on the amplitude data to generate a semblance plot, performing a velocity analysis on the semblance plot to define a stacking velocity function, and defining the low-pass and high-pass regions by reference to the velocity function. The low-pass and high-pass regions also may be determined by performing a pre-stack time migration analysis on the amplitude data to define a velocity function and the regions by reference thereto. Typically, semblance and pre-stack migration analyses are conducted in the time-velocity domain, and thus, low-pass and high-pass regions defined thereby will be transformed into slowness pass regions for application to the transformed data in the tau-P domain. Alternately, however, the semblance analysis or pre-stack migration analysis may be conducted in the tau-P domain to yield a slowness function for primary reflection signals and the slowness pass regions defined by reference thereto.

For example, as described above, a semblance analysis is performed on the offset weighted amplitude data to generate a semblance plot and a stacking velocity function in step 5 of the preferred method of FIG. 1. Then, in steps 8a and 8b, respectively, the velocity function is used to define the velocity and then, by transformation, slowness low-pass and high-pass regions which enhance, respectively, low slowness and high slowness coherent noise while diminishing primary reflection signals. When the semblance analysis is performed on amplitude data that have been offset weighted, as described above, the resulting velocity analysis will be more accurate and, therefore, a more effective filter may be defined. It will be appreciated, however, that the semblance analysis may be performed on data that have not been offset weighted. Significant improvements in accuracy and computational efficiency still will be achieved by the subject invention.

The transformed data are then filtered with the slowness low-pass and high-pass regions as shown in step 9 to enhance the coherent noise and diminish the primary reflection signal content of the transformed data. The filtered data then comprise a first subset having enhanced low slowness coherent ("LSC") noise content, which results from the application of the low-pass region, and a second subset having enhanced high slowness coherent ("HSC") noise content, which results from the application of the high-pass region. In both subsets of data the primary reflection signal content is diminished. The low slowness coherent noise is coherent noise having slownesses less than the slowness of the primary signal at the corresponding tau. Similarly, high-slowness coherent noise is coherent noise having slownesses greater than the slowness of the primary signal at the corresponding tau.

The slowness low-pass region may be defined by reference to the velocity function for primary reflection signals, as determined, for example, through the semblance analysis described above. The stacking velocity function, $v_s=[t_o, v_s(t_o)]$, describes the velocity of primary reflections signals as a function of $t_o$. A minimum velocity, $v_{min}(t_o)$, is defined on one side of the velocity function, for example, with a given percentage of the velocity function. In such cases, the velocity high-pass region ($v_{high}$) at a selected time $t_o$ corresponds to $v_s(1+r_1) < v_{high}$, where $r_1$ is a percentage expressed as a decimal. The velocity function will transform to a slowness function, $p_s=[\tau, p(\tau)]$, in the tau-P domain. Similarly, the velocity high-pass region will map into a slowness low-pass region, namely:

$$p_{low} < p_s(1-r_1)$$

for application to the transformed data in the tau-P domain. Alternately, the slowness low-pass region may be derived directly from the slowness function for primary reflection signals, for example, by conducting the semblance analysis in the time-slowness domain.

The slowness high-pass region may be similarly defined by reference to the velocity function for primary reflection signals, as determined, for example, through the semblance analysis described above. A maximum velocity, $v_{max}(t_o)$, is defined on the other side of the velocity function, for example, with a given percentage of the velocity function. In such cases, the velocity low-pass region ($v_{low}$) at a selected time $t_o$ corresponds to $v_{low} < v_s(1-r_2)$, where $r_2$ is a percentage expressed as a decimal. The velocity low-pass region will map into a slowness high-pass region, namely:

$$p_s(1+r_2) < p_{high}$$

for application to the transformed data in the tau-P domain. Alternately, the slowness high-pass region may be derived directly from the slowness function for primary reflection signals, for example, by conducting the semblance analysis in the time-slowness domain.

When the slowness function for the primary reflection signals is time variant, the limits for the low-pass and high-pass regions preferably are time variant as well. In that manner, the low-pass and high-pass regions may more closely fit the reflection's slowness function and, therefore, more effectively enhance, respectively, low slowness and high slowness coherent noise and diminish primary reflection signals and water bottom reflection signals.

It will be appreciated, however, that the limits for one or both of the low-pass and high-pass regions may, if desired, be made time invariant. Although such regions in general will not enhance coherent noise and diminish primary signal content as effectively as when the region is time variant, and especially when both the low-pass and high-pass regions are time variant, they may be adapted for use in the subject invention. Also, when the transformed data have been corrected for normal moveout, the slowness function for primary reflection signals should be substantially time invariant, i.e., essentially zero across all times. Thus, under such circumstances, the efficacy of a slowness high-pass region may not be improved substantially by making it time variant as in the more preferred methods where the transformed data are uncorrected for normal moveout.

The limits for the low-pass and high-pass regions should be set as closely as possible to the slowness function in order to achieve the most effective enhancement, respectively, of low slowness and high slowness coherent noise signals while diminishing primary reflection signals. As a general matter, the limit for the slowness high-pass region will more closely approach the slowness function of the primary reflection signals. When the transformed data have been NMO corrected, near trace multiple signals will transform at or very near to zero slowness along with primary reflection signals. Although most multiple reflection signals will transform at greater slownesses than primary reflection signals when data are not NMO corrected, in either instance the limit for the slowness high-pass region will be set above, but relatively close to the slowness function to avoid the diminution of high slowness multiple reflection signals along with primary reflections signals. Thus, the limit for the slowness high-pass region typically will be set within 5%, preferably within 3%, and most preferably within 1% above the slowness function of the primary reflection signals.

The limit for the slowness low-pass region, however, is not as sensitive since even when the transformed data are uncorrected for normal moveout fewer multiples will transform at slownesses less than the primary reflection signals. It typically will be set within 10%, preferably within 5%, and most preferably within 2% below the slowness of the primary reflection signals. $r_1$ and $r_2$ may be set accordingly. It will be understood, of course, that the tolerances within which the limits of the pass regions are optimally set will vary depending on the particular seismic data being processed and their noise content.

Thus, while the novel methods may be applied to data that have been NMO corrected prior to transformation, it is preferred that the data be uncorrected for normal moveout so that a slowness low-pass region may be used to filter the data and thereby to more effectively enhance the coherent noise content of the filtered data. When data are NMO corrected, near trace multiples will transform at or very near zero slowness along with primary reflection signals. Thus, transforming NMO corrected data into the time-slowness domain effects very little separation between near trace multiples and primary reflection signals, and near trace multiples tend to be attenuated along with primary reflection signals when a slowness high-pass filter is applied. Since they are attenuated in the tau-P domain, near trace multiples are not subtracted from and remain in the original data gather as noise that can mask primary reflection signals. Moreover, the near trace reflection signals that are attenuated and remain in the data after subtraction can have greater amplitude than the primary signals. They also can represent a disproportionately greater share of the total amplitude of the reflection signals.

When the data are uncorrected for normal moveout, however, signals for primary reflections do not transform at or near zero slowness, i.e., they transform above a definable slowness, and most multiple reflection signals, including those for near traces, transform into regions of greater slowness than those for primary signals. Thus, primary signals may be attenuated and higher slowness multiples enhanced by applying a high-pass region, where $p_{high}$ is greater than the slowness of the primary signals but yet less than the slowness of the multiples, and any coherent noise transforming at slowness less that the primary signals, may be enhanced by applying a low-pass region, where $p_{low}$ is less than the slowness of the primary signals but greater than low slowness multiples. The use and advantages of applying slowness low-pass and high-pass regions to enhance coherent noise and to diminish primary reflection signals are described in further detail in the application of John M. Robinson entitled "Removal of Noise From Seismic Data Using Radon Transformations," which was filed on Mar. 3, 2005, the disclosure of which is incorporated herein by reference.

It will be appreciated that in designing algorithms to filter the transformed data as described above, such algorithms may be expressed as defining a rejection region instead of pass regions. That is, any given "pass" limit allowing the passage of data on one side of the limit may be equivalently expressed as a "rejection" limit rejecting data on the other side of the limit. Further, the definition of a "pass" region necessarily defines at the same time a corresponding "rejection" regions, whether or not the algorithms express them as such. Thus, in the context of the subject invention, the definition of slowness low-pass and high pass regions shall be understood to include the definition of any rejection limits and regions which enhance low and high slowness coherent noise and diminish primary reflection signals as described above.

Inverse Transforming the Data

After filtering the data to enhance the coherent noise content of the transformed data, the methods of the subject invention further comprise the step of inverse transforming the filtered data from the time-slowness domain back to the offset-time domain using an inverse Radon transformation. If, as is preferable, an offset weighting factor $x^n$ was applied to the transformed data, an inverse of the offset weighting factor $p^n$ is applied to the inverse transformed first and second data subsets. Similarly, if other amplitude balancing operators, such as an AGC operator or an operator based on trace envelopes, were applied, an inverse of the amplitude balancing operator is applied. The amplitude data for the filtered data are thereby restored.

For example, in step 10 of the method of FIG. 1, an inverse hyperbolic Radon transformation is used to inverse transform the first and second data subsets having, respectively, enhanced low slowness noise and enhanced high slowness noise content from the time-slowness domain back to the offset-time domain. An inverse of the offset weighting factor $p^n$ then is applied to the inverse transformed data, as shown in step 11. The amplitude data for the first and second data subsets are thereby restored.

A general mathematical formulation utilizing the inverse offset weighting factor and encompassing the linear, parabolic, and hyperbolic inverse Radon transforms is as follows:

$$d(x,t) = \int_{-\infty}^{\infty} dp \int_{-\infty}^{\infty} d\tau p^n \rho(\tau) * u(p,\tau) \delta[g(t,x,\tau,p)] \quad (3)$$

(inverse transformation)

where $u(p,\tau)$=transform coefficient at slowness p and zero-offset time $\tau$ $d(x,t)$=measured seismogram at offset x and two-way time t $p^n$=inverse offset weighting factor (0<n<1)

$\rho(\tau)*$=convolution of rho filter $\delta$=Dirac delta function $g(t,x,\tau,p)$=inverse transform function The inverse transform function for hyperbolic trajectories is as follows:

$$g(t,x,\tau,p)=\tau-\sqrt{t^2-p^2x^2}$$

Thus, when $\tau=\sqrt{t^2-p^2x^2}$, the inverse hyperbolic Radon transformation equation becomes $$d(x,t) = \int_{-\infty}^{\infty} dp\, p^n \rho(\tau) * u\left(p, \sqrt{t^2-p^2x^2}\right)$$

The inverse transform function for linear slant stack trajectories is as follows:

$$g(t,x,\tau,p)=\tau-t+px$$

Thus, when τ=t−px, the inverse linear slant stack Radon transformation equation becomes $$d(x, t) = \int_{-\infty}^{\infty} dp\, p^n \rho(\tau) * u(p, t - px)$$

The inverse transform function for parabolic trajectories is as follows:

$$g(t,x,\tau,p) = \tau - t + px^2$$

Thus, when τ=t−px², the inverse parabolic Radon transformation equation becomes $$d(x, t) = \int_{-\infty}^{\infty} dp\, p^n \rho(\tau) * u(p, t - px^2)$$

As with the forward transform function $f(t,x,\tau, p)$ in conventional Radon transformations, the inverse travel-time function $g(t,x,\tau,p)$ allows kinematic travel time trajectories to include anisotropy, P-S converted waves, wave-field separations, and other applications of current industry that are used to refine the analysis consistent with conditions present in the survey area.

As noted, the inverse Radon transformations set forth above in Equation 3 incorporate an inverse offset weighting factor $p^n$, where p is slowness. The inverse offset weighting factor restores the original amplitude data which now contain enhanced coherent noise and diminished primary reflection signal content. Accordingly, smaller offsets receive preferentially larger weights since they received preferentially less weighting prior to filtering. The power n is greater than zero, but less than 1. Preferably, n is approximately 0.5 because amplitudes seem to be preserved better at that value. While the power n appears to be robust and insensitive, it probably is data dependent to some degree.

As discussed above relative to the forward transformations, the continuous inverse transformations set forth above preferably are translated into discrete transformation equations which approximate the solutions provided by continuous transformation equations and can be encoded into and executed by computers.

For example, assume a transform coefficient $u(p,\tau)$ contains 2J+1 discrete values of the parameter p and M discrete values of the parameter τ, i.e., $$j = 0, \pm 1, \ldots, \pm J \text{ and}$$

$$m = 1, \ldots, M$$

and that $$p_{-J} < p_{-J+1} < \ldots < p_{J-1} < p_J$$

A discrete general transform equation approximating the continuous general transform Equation 3 set forth above, therefore, may be derived as set forth below:

$$d(x, t) = \sum_{j=-J}^{J} \sum_{m=1}^{M} u(p_j \tau_m) p_j^n \rho(\tau) * \delta[g(t, x, \tau_m, p_j)] \Delta p_j \Delta \tau_m \quad (4)$$

where $$\Delta p_j = \frac{p_{j+1} - p_{j-1}}{2} \text{ for } j = 0, \pm 1, \ldots, \pm(J-1)$$

$$\Delta p_J = p_J - p_{J-1}$$

$$\Delta p_{-J} = p_{-J+1} - p_{-J}$$

$$\Delta \tau_m = \frac{\tau_{m+1} - \tau_{m-1}}{2} \text{ for } m = 2, \ldots, M-1$$

$$\Delta \tau_1 = \tau_2 - \tau_1$$

$$\Delta \tau_M = \tau_M - \tau_{M-1}$$

By substituting the hyperbolic inverse transform function set forth above, the discrete general inverse transformation Equation 4 above, when $\tau = \sqrt{t^2 - p^2 x^2}$, may be reduced to the discrete inverse transformation based on hyperbolic kinematic travel time trajectories that is set forth below:

$$d(x, t) = \sum_{j=-J}^{J} p_j^n \rho(\tau) * u\left(p_j, \sqrt{t^2 - p_j^2 x^2}\right) \Delta p_j$$

Similarly, when τ=t−px, the discrete linear slant stack inverse transformation derived from the general Equation 4 is as follows:

$$d(x, t) = \sum_{j=-J}^{J} p_j^n \rho(\tau) * u(p_j, t - p_j x) \Delta p_j$$

When τ=t−px², the discrete parabolic inverse transformation is as follows:

$$d(x, t) = \sum_{j=-J}^{J} p_j^n \rho(\tau) * u(p_j, t - p_j x^2) \Delta p_j$$

Those skilled in the art will appreciate that the foregoing inverse transformation Equations 3 and 4 are not exact inverses of the forward transformation Equations 1 and 2. They are sufficiently accurate, however, and as compared to more exact inverse equations, they are less complicated and involve fewer mathematical computations. For example, more precise inverse transformations could be formulated with Fourier transform equations, but such equations require an extremely large number of computations to execute. For that reason, the foregoing equations are preferred, but it is believed that other inverse transformation equations are known, and still others may be devised by workers of ordinary skill for use in the subject invention.

The transformations and semblance analyses described above, as will be appreciated by those skilled in the art, are performed by sampling the data according to sampling variables Δt, Δx, Δτ, and Δp. Because the novel methods do not require NMO correction prior to transformation or a least mean square analysis, sampling variables may be much finer. Specifically, Δt and Δτ may be set as low as the sampling rate at which the data were collected, which is typically 1 to 4 milliseconds, or even lower if lower sampling rates are used. Δp values as small as about 0.5 μsec/m may be used. Preferably, Δp is from about 0.5 to 4.0 μsec/m, more preferably from about 0.5 to about 3.0 μsec/m, and even more preferably from about 0.5 to about 2.0 μsec/m. Most preferably Δp is set at 1.0 μsec/m. Since the sampling variables are finer, the calculations are more precise. It is preferred, therefore, that the sampling variables Δt, Δx, and Δτ be set at the corresponding sampling rates for the seismic data field records and that Δp be set at 1 μsec/m. In that manner, all of the data recorded by the receivers are processed. It also is not necessary to interpolate between measured offsets.

Moreover, the increase in accuracy achieved by using finer sampling variables in the novel processes is possible without a significant increase in computation time or resources. Although the novel transformation equations and offset weighting factors may be operating on a larger number of data points, those operations require fewer computations that prior art process. On the other hand, coarser sampling variables more typical of prior art processes may be used in the novel process, and they will yield accuracy comparable to that of the prior art, but with significantly less computational time and resources.

Subtraction of Data Subsets

After restoring the amplitude data for the filtered data, the methods of the subject invention further comprise the step of subtracting the restored amplitude data of the filtered data from the original assembled amplitude data. In this manner, the coherent noise content of the assembled amplitude data is diminished and the primary reflection signal content enhanced. The processed and filtered data may then be subjected to further processing by which inferences about the subsurface geology of the survey area may be made.

For example, in step 12 of the method of FIG. 1, the restored first and second data subsets are subtracted from the amplitude data assembled in step 2. By subtracting the first data subset, in which low slowness coherent noise content has been enhanced and then restored, low slowness coherent noise is diminished in the assembled amplitude data. Similarly, by subtracting the second data subset, in which high slowness coherent noise content has been enhanced and then restored, high slowness coherent noise is diminished in the assembled amplitude data.

Refining of the Stacking Velocity Function

The subject invention also encompasses improved methods for determining a stacking velocity function which may be used in processing seismic data. Such improved methods comprise the steps of performing a semblance analysis on the processed data to generate a second semblance plot. Though not essential, preferably an offset weighting factor $x^n$, where $0<n<1$, is first applied to the processed data. A velocity analysis is then performed on the second semblance plot to define a second stacking velocity function. It will be appreciated that this second stacking velocity, because it has been determined based on data processed in accordance with the subject invention, more accurately reflects the true stacking velocity function and, therefore, that inferred depths and compositions of geological formations and any other subsequent processing of the data that utilizes a stacking velocity function are more accurately determined.

For example, as shown in step 13 of FIG. 1, an offset weighting factor $x^n$ is applied to the data from which coherent noise was subtracted in step 12. A semblance plot is then generated from the offset weighted data as shown in step 14. The semblance plot is used to determine a stacking velocity function in step 15 which then can be used in further processing as in step 16.

Display and Further Processing of Data

After the coherent noise data have been subtracted from the assembled amplitude data, they may be displayed for analysis, for example, as shown in step 17 of FIG. 1. The filtered data set, as discussed above, may be used to more accurately define a stacking velocity function. It also may subject to further processing before analysis as shown in step 18. Such processes may include pre-stack time or depth migration, frequency-wave number filtering, other amplitude balancing methods, removal of aliasing effects, seismic attribute analysis, spiking deconvolution, data stack processing, and other methods known to workers in the art. The appropriateness of such further processing will depend on various geologic, geophysical, and other conditions well known to workers in the art.

Invariably, however, the data in the gather, after they have been processed and filtered in accordance with the subject invention, will be stacked together with other data gathers in the survey that have been similarly processed and filtered. The stacked data are then used to make inference about the subsurface geology in the survey area. Ultimately, the increased accuracy and efficiency of the novel processes enhances the accuracy of surveying underground geological features and, therefore, the likelihood of accurately locating the presence of oil and gas deposits.

The methods of the subject invention preferably are implemented by computers, preferably digital computers, and other conventional data processing equipment. Such data processing equipment, as appreciated by workers in the art, will typically comprise a storage device and a processor connected to the storage device, wherein the storage device stores a software program for controlling the processor to execute the novel methods. An output signal for displaying the processed data will be provided to a printer, monitor, or other display device. Suitable software for doing so may be written in accordance with the disclosure herein. Such software also may be designed to process the data by additional methods outside the scope of, but complimentary to the novel methods. Accordingly, it will be appreciated that suitable software will include a multitude of discrete commands and operations that may combine or overlap with the steps as described herein. Thus, the precise structure or logic of the software may be varied considerably while still executing the novel processes.

Accordingly, the subject invention is also directed to methods of processing seismic data in a computer system to remove unwanted noise from meaningful reflection signals indicative of subsurface formations and for generating an output signal to provide a display of the processed data. The methods comprise the steps of inputting into the computer seismic data detected at a number of seismic receivers in an area of interest. The seismic data comprise amplitude data recorded over time and contain both primary reflection signals and unwanted noise events. The computer system is operated in accordance with a computer program to assemble the amplitude data into common geometry gathers in an offset-time domain. Preferably, an offset weighting factor $x^n$ is applied to the assembled amplitude data, wherein $0<n<1$.

The computer system then transforms the assembled amplitude data from the offset-time domain to the time-slowness domain using a Radon transformation. Preferably, the Radon transformation is applied within defined slowness limits its $p_{min}$ and $p_{max}$, where $p_{min}$ is a predetermined minimum slowness and $p_{max}$ is a predetermined maximum slowness that will preserve coherent noise, and/or according to an index j of the slowness set and a sampling variable Δp, wherein $$j = \frac{p_{max} - p_{min} + 1\mu\text{sec/m}}{\Delta p},$$

$\Delta p$ is from about 0.5 to about 4.0 μsec/m, $p_{max}$ is a predetermined maximum slowness, and $p_{min}$ is a predetermined minimum slowness.

At least a subset of the transformed data is filtered to enhance the coherent noise content and to diminish the primary reflection signal content of the transformed data, thereby generating filtered data having enhanced coherent noise content. The filtered data are then inverse transformed from the time-slowness domain back to the offset-time domain using an inverse Radon transformation and, if necessary, an inverse of the offset weighting factor $p''$ is applied, wherein $0<n<1$, thereby restoring the amplitude data for the filtered data.

The computer system then subtracts the restored amplitude data of the filtered data from the assembled amplitude data, thereby diminishing the coherent noise content of the assembled amplitude data and enhancing their primary reflection signal content, and generates an output signal for providing a display of the enhanced data.

The subject invention also provides for methods of selecting a drilling site to access a subsurface formation. The methods comprise the steps of obtaining field records of seismic data detected at a number of seismic receivers in an area of interest. The seismic data comprise amplitude data recorded over time and contain both primary reflection signals and unwanted noise events. The seismic data are then processed to search for the presence of a subsurface formation of interest. The processing removes unwanted noise from meaningful reflection signals indicative of subsurface formations and comprises the steps of assembling the amplitude data into common geometry gathers in an offset-time domain. Preferably, an offset weighting factor $x''$ is applied to the assembled amplitude data, wherein $0<n<1$.

The assembled data are then transformed from the offset-time domain to the time-slowness domain using a Radon transformation. Preferably, the Radon transformation is applied within defined slowness limits $p_{min}$ and $p_{max}$, where $p_{min}$ is a predetermined minimum slowness and $p_{max}$ is a predetermined maximum slowness that will preserve coherent noise, and/or according to an index j of the slowness set and a sampling variable $\Delta p$, wherein $$j = \frac{p_{max} - p_{min} + 1\mu\text{sec/m}}{\Delta p},$$

$\Delta p$ is from about 0.5 to about 4.0 μsec/m, $p_{max}$ is a predetermined maximum slowness, and $p_{min}$ is a predetermined minimum slowness.

At least a subset of the transformed data is filtered to enhance the coherent noise content and to diminish the primary reflection signal content of the transformed data, thereby generating filtered data having enhanced coherent noise content. The filtered data are then inverse transformed from the time-slowness domain back to the offset-time domain using an inverse Radon transformation and, if necessary, an inverse of the offset weighting factor $p''$ is applied, wherein $0<n<1$, thereby restoring the amplitude data for the filtered data.

The restored amplitude data of the filtered data are then subtracted from the assembled amplitude data, thereby diminishing the coherent noise content of the assembled amplitude data and enhancing the primary reflection signal content thereof. Drilling is then conducted at a location likely to access the subsurface formations indicated by the processing steps.

The subject invention also provides for apparatus for processing seismic data to remove unwanted noise from meaningful reflection signals indicative of subsurface formations. The apparatus comprises a storage device and a processor connected to the storage device. The storage device stores a program for controlling the processor which, with the program, operates to receive computer seismic data detected at a number of seismic receivers in an area of interest. The seismic data comprise amplitude data recorded over time and contain both primary reflection signals and unwanted noise events. The apparatus then assembles the amplitude data into common geometry gathers in an offset-time domain. Preferably, an offset weighting factor $x''$ is applied to the assembled amplitude data, wherein $0<n<1$.

The assembled amplitude data are then transformed from the offset-time domain to the time-slowness domain using a Radon transformation. Preferably, the Radon transformation is applied within defined slowness limits $p_{min}$ and $p_{max}$, where $p_{min}$ is a predetermined minimum slowness and $p_{max}$ is a predetermined maximum slowness that will preserve coherent noise, and/or according to an index j of the slowness set and a sampling variable $\Delta p$, wherein $$j = \frac{p_{max} - p_{min} + 1\mu\text{sec/m}}{\Delta p},$$

$\Delta p$ is from about 0.5 to about 4.0 μsec/m, $p_{max}$ is a predetermined maximum slowness, and $p_{min}$ is a predetermined minimum slowness.

At least a subset of the transformed data is filtered to enhance the coherent noise content and to diminish the primary reflection signal content of the transformed data, thereby generating filtered data having enhanced coherent noise content. The filtered data are then inverse transformed from the time-slowness domain back to the offset-time domain using an inverse Radon transformation and, if necessary, an inverse of the offset weighting factor $p''$ is applied, wherein $0<n<1$, thereby restoring the amplitude data for the filtered data.

The apparatus then subtracts the restored amplitude data of the filtered data from the assembled amplitude data, thereby diminishing the coherent noise content of the assembled amplitude data and enhancing the primary reflection signal content thereof.

While this invention has been disclosed and discussed primarily in terms of specific embodiments thereof, it is not intended to be limited thereto. Other modifications and embodiments will be apparent to the worker in the art.

What is claimed is:

1. A method of processing seismic data to remove unwanted noise from meaningful reflection signals indicative of subsurface formations, comprising the steps of:
   (a) obtaining field records of seismic data detected at a number of seismic receivers in an area of interest, said seismic data comprising amplitude data recorded over time and containing primary reflection signals and unwanted noise events;
   (b) assembling said amplitude data into common geometry gathers in an offset-time domain;

(c) transforming said assembled amplitude data from the offset-time domain to the time-slowness domain using a Radon transformation according to an index j of the slowness set and a sampling variable Δp; wherein $$j = \frac{p_{max} - p_{min} + 1\mu sec/m}{\Delta p},$$

Δp is from about 0.5 to about 4.0 μsec/m, $p_{max}$ is a predetermined maximum slowness, and $p_{min}$ is a predetermined minimum slowness;
(d) filtering at least a subset of said transformed data to enhance the coherent noise content and to diminish the primary reflection signal content of said transformed data, thereby generating filtered data having enhanced coherent noise content;
(e) inverse transforming said filtered data from the time-slowness domain back to the offset-time domain using an inverse Radon transformation, thereby restoring the amplitude data for said filtered data; and
(f) subtracting said restored amplitude data of said filtered data from said data assembled in step (b), thereby diminishing the coherent noise content of said assembled amplitude data and enhancing the primary reflection signal content thereof.

2. The method of claim 1, wherein said amplitude data are assembled into common midpoint geometry gathers.

3. The method of claim 1, wherein Δp is from about 0.5 to 3.0 μsec/m.

4. The method of claim 1, wherein Δp is from about 0.5 to 2.0 μsec/m.

5. The method of claim 1, wherein Δp is about 1.0 μsec/m.

6. The method of claim 1, wherein j is from about 125 to about 1000.

7. The method of claim 1, wherein j is from about 250 to about 1000.

8. The method of claim 1, wherein $p_{max}$ is greater than the slowness of reflection signals from the shallowest reflective surface of interest, and $p_{min}$ is less than the slowness of reflection signals from the deepest reflective surface of interest.

9. The method of claim 1, wherein $p_{min}$ is less than the slowness of reflection signals from the deepest reflective surface of interest.

10. The method of claim 1, wherein said field records are obtained from a marine survey and $p_{max}$ is greater than the slowness of reflective signals through water in the area of interest.

11. The method of claim 1, wherein $p_{max}$ is greater than the slowness of reflection signals from the shallowest reflective surface of interest.

12. The method of claim 1, wherein said assembled amplitude data are transformed using a hyperbolic Radon transformation and inverse transformed using an inverse hyperbolic Radon transformation.

13. The method of claim 1, wherein:
(a) an offset weighting factor $x^n$ is applied to said assembled amplitude data, wherein x is offset and 0<n<1; and
(b) an inverse of the offset weighting factor $p^n$ is applied to said inverse transformed data, wherein 0<n<1.

14. The method of claim 1, wherein said Radon transformation is applied within defined slowness limits $p_{min}$ and $p_{max}$, where $p_{min}$ is a predetermined minimum slowness less than the slowness of reflection signals from the deepest reflective surface of interest and $p_{max}$ is a predetermined maximum slowness greater than the slowness of reflection signals from the shallowest reflective surface of interest that will preserve coherent noise.

15. The method of claim 13, wherein said Radon transformation is applied within defined slowness limits $p_{min}$ and $p_{max}$, where $p_{min}$ is a predetermined minimum slowness less than the slowness of reflection signals from the deepest reflective surface of interest and $p_{max}$ is a predetermined maximum slowness greater than the slowness of reflection signals from the shallowest reflective surface of interest that will preserve coherent noise.

16. The method of claim 1, wherein all of said transformed data are filtered in step (d).

17. The method of claim 1, wherein only a subset of said transformed data is filtered in step (d).

18. The method of claim 1, wherein said at least a subset of said transformed data is filtered by defining a high-pass region to enhance the high slowness coherent noise content and to diminish the primary reflection signal content thereof, thereby generating filtered data having enhanced high slowness coherent noise content.

19. The method of claim 18, wherein said high-pass region is time variant.

20. The method of claim 18, wherein said high-pass region is defined as follows:

$$p_s(1+r_2) < p_{high}$$

where $p_s$ is the slowness function for primary reflection signals and $r_2$ is a percentage expressed as decimals.

21. The method of claim 18, wherein said high-pass region is determined by:
(a) performing a semblance analysis on said amplitude data to generate a semblance plot; and
(b) performing a velocity or slowness analysis on said semblance plot to define a stacking velocity or slowness function and said high-pass region.

22. The method of claim 1, wherein said assembled amplitude data are uncorrected for normal moveout.

23. The method of claim 13, wherein said assembled amplitude data are uncorrected for normal moveout.

24. The method of claim 14, wherein said assembled amplitude data are uncorrected for normal moveout.

25. The method of claim 15, wherein said assembled amplitude data are uncorrected for normal moveout.

26. The method of claim 1, further comprising the step of forming a display of said restored data.

27. A method of processing seismic data to remove unwanted noise from meaningful reflection signals indicative of subsurface formations, comprising the steps of:
(a) obtaining field records of seismic data detected at a number of seismic receivers in an area of interest, said seismic data comprising amplitude data recorded over time and containing primary reflection signals and unwanted noise events;
(b) assembling said amplitude data into common geometry gathers in an offset-time domain;
(c) transforming said assembled amplitude data from the offset-time domain to the time-slowness domain using a Radon transformation, wherein said Radon transformation is applied within defined slowness limits $p_{min}$ and $p_{max}$, where $p_{min}$ is a predetermined minimum slowness less than the slowness of reflection signals from the deepest reflective surface of interest and $p_{max}$ is a predetermined maximum slowness greater than the slowness of reflection signals from the shallowest reflective surface of interest that will preserve coherent noise;

(d) filtering at least a subset of said transformed data to enhance the coherent noise content and to diminish the primary reflection signal content of said transformed data, thereby generating filtered data having enhanced coherent noise content;
(e) inverse transforming said filtered data from the time-slowness domain back to the offset-time domain using an inverse Radon transformation, thereby restoring the amplitude data for said filtered data; and
(f) subtracting said restored amplitude data of said filtered data from said data assembled in step (b), thereby diminishing the coherent noise content of said assembled amplitude data and enhancing the primary reflection signal content thereof.

28. The method of claim 27, wherein said field records are obtained from a land survey and $p_{min}$ is up to 10% less than 165 μsec/m and $p_{max}$ is up to 20% greater than 3,125 μsec/m.

29. The method of claim 27, wherein said field records are obtained from a land survey and $p_{min}$ is up to 10% less than 185 μsec/m and $p_{max}$ is up to 20% greater than 500 μsec/m.

30. The method of claim 27, wherein said field records are obtained from a marine survey and $p_{min}$ is up to 10% less than 165 μsec/m and $p_{max}$ is up to 20% greater than 690 μsec/m.

31. The method of claim 27, wherein said field records are obtained from a marine survey and $p_{min}$ is up to 10% less than 185 μsec/m and $p_{max}$ is up to 20% greater than 655 μsec/m.

32. The method of claim 27, wherein said field records are obtained from a marine survey and $p_{max}$ is greater than the slowness of reflective signals through water in the area of interest.

33. The method of claim 27, wherein said field records are obtained from a marine survey and $p_{max}$ is up to 20% greater than the slowness of reflective signals through water in the area of interest.

34. The method of claim 27, wherein $p_{max}$ is up to 20% greater than the slowness of reflection signals from the shallowest reflective surface of interest.

35. The method of claim 27, wherein said field records are obtained from a marine survey, $p_{min}$ is up to 10% less than the slowness of reflection signals from the deepest reflective surface of interest.

36. The method of claim 27, wherein said field records are obtained from a marine survey, $p_{min}$ is up to 10% less than the slowness of reflection signals from the deepest reflective surface of interest, and $p_{max}$ is up to 20% greater than the slowness of reflective signals through water in the area of interest.

37. The method of claim 27, wherein $p_{min}$ is up to 10% less than the slowness of reflection signals from the deepest reflective surface of interest and $p_{max}$ is up to 20% greater than the slowness of reflection signals from the shallowest reflective surface of interest.

38. The method of claim 27, wherein said slowness limits $p_{min}$ and $p_{max}$ are determined by reference to a velocity or slowness function of the primary reflection signals derived by performing a semblance analysis or a pre-stack time migration analysis on the amplitude data.

39. The method of claim 27, wherein:
(a) an offset weighting factor $x^n$ is applied to said assembled amplitude data, wherein x is offset and 0<n<1; and
(b) an inverse of the offset weighting factor $p^n$ is applied to said inverse transformed data, wherein 0<n<1.

40. The method of claim 27, wherein said assembled amplitude data are transformed using a hyperbolic Radon transformation and inverse transformed using an inverse hyperbolic Radon transformation.

41. The method of claim 27, wherein said assembled amplitude data are uncorrected for normal moveout.

42. The method of claim 37, wherein said assembled amplitude data are uncorrected for normal moveout.

43. The method of claim 27, further comprising the step of forming a display of said restored data.

44. The method of claim 3, wherein j is from about 125 to about 1000.

45. The method of claim 4, wherein j is from about 125 to about 1000.

46. The method of claim 3, wherein j is from about 250 to about 1000.

47. The method of claim 4, wherein j is from about 250 to about 1000.

48. The method of claim 44, wherein:
(a) an offset weighting factor $x^n$ is applied to said assembled amplitude data, wherein x is offset and 0<n<1; and
(b) an inverse of the offset weighting factor $p^n$ is applied to said inverse transformed data, wherein 0<n<1.

49. The method of claim 47, wherein:
(a) an offset weighting factor $x^n$ is applied to said assembled amplitude data, wherein x is offset and 0<n<1; and
(b) an inverse of the offset weighting factor $p^n$ is applied to said inverse transformed data, wherein 0<n<1.

50. The method of claim 14, wherein $p_{min}$ up to 10% less than the slowness of reflection signals from the deepest reflective surface of interest and $p_{max}$ is up to 20% greater than the slowness of reflection signals from the shallowest reflective surface of interest.

51. The method of claim 15, wherein $p_{min}$ is up to 10% less than the slowness of reflection signals from the deepest reflective surface of interest and $p_{max}$ is up to 20% greater than the slowness of reflection signals from the shallowest reflective surface of interest.

52. The method of claim 44, wherein said Radon transformation is applied within defined slowness limits $p_{min}$ and $p_{max}$ where $p_{min}$ is a predetermined minimum slowness up to 10% less than the slowness of reflection signals from the deepest reflective surface of interest and $p_{max}$ is a predetermined maximum slowness up to 20% greater than the slowness of reflection signals from the shallowest reflective surface of interest that will preserve coherent noise.

53. The method of claim 47, wherein said Radon transformation is applied within defined slowness limits $p_{min}$ and $p_{max}$, where $p_{min}$ is a predetermined minimum slowness up to 10% less than the slowness of reflection signals from the deepest reflective surface of interest and $p_{max}$ is a predetermined maximum slowness up to 20% greater than the slowness of reflection signals from the shallowest reflective surface of interest that will preserve coherent noise.

54. The method of claim 44, wherein said at least a subset of said transformed data is filtered by defining a high-pass region to enhance the high slowness coherent noise content and to diminish the primary reflection signal content thereof, thereby generating filtered data having enhanced high slowness coherent noise content.

55. The method of claim 47, wherein said at least a subset of said transformed data is filtered by defining a high-pass region to enhance the high slowness coherent noise content and to diminish the primary reflection signal content thereof, thereby generating filtered data having enhanced high slowness coherent noise content.

56. The method of claim 48, wherein said at least a subset of said transformed data is filtered by defining a high-pass region to enhance the high slowness coherent noise content and to diminish the primary reflection signal content thereof, thereby generating filtered data having enhanced high slowness coherent noise content.

57. The method of claim 49, wherein said at least a subset of said transformed data is filtered by defining a high-pass region to enhance the high slowness coherent noise content and to diminish the primary reflection signal content thereof, thereby generating filtered data having enhanced high slowness coherent noise content.

58. The method of claim 50, wherein said at least a subset of said transformed data is filtered by defining a high-pass region to enhance the high slowness coherent noise content and to diminish the primary reflection signal content thereof, thereby generating filtered data having enhanced high slowness coherent noise content.

59. The method of claim 51, wherein said at least a subset of said transformed data is filtered by defining a high-pass region to enhance the high slowness coherent noise content and to diminish the primary reflection signal content thereof, thereby generating filtered data having enhanced high slowness coherent noise content.

60. The method of claim 52, wherein said at least a subset of said transformed data is filtered by defining a high-pass region to enhance the high slowness coherent noise content and to diminish the primary reflection signal content thereof, thereby generating filtered data having enhanced high slowness coherent noise content.

61. The method of claim 53, wherein said at least a subset of said transformed data is filtered by defining a high-pass region to enhance the high slowness coherent noise content and to diminish the primary reflection signal content thereof, thereby generating filtered data having enhanced high slowness coherent noise content.

62. The method of claim 44, wherein said assembled amplitude data are uncorrected for normal moveout.

63. The method of claim 47, wherein said assembled amplitude data are uncorrected for normal moveout.

64. The method of claim 50, wherein said assembled amplitude data are uncorrected for normal moveout.

65. The method of claim 51, wherein said assembled amplitude data are uncorrected for normal moveout.

66. The method of claim 52, wherein said assembled amplitude data are uncorrected for normal moveout.

67. The method of claim 54, wherein said assembled amplitude data are uncorrected for normal moveout.

68. The method of claim 58, wherein said assembled amplitude data are uncorrected for normal moveout.

69. The method of claim 59, wherein said assembled amplitude data are uncorrected for normal moveout.

70. The method of claim 61, wherein said assembled amplitude data are

* * * * *